United States Patent [19]

Hiramatsu et al.

[11] Patent Number: 4,882,833

[45] Date of Patent: Nov. 28, 1989

[54] METHOD AND APPARATUS FOR MOUNTING COILS INSIDE A HOLLOW CYLINDRICAL ARTICLE

[75] Inventors: Hiromichi Hiramatsu; Hitoshi Odashima, both of Yokohama; Kuniaki Hirayama, Katsuta; Toshio Ohji, Mito, all of Japan

[73] Assignee: Hitachi, Ltd., Tokyo, Japan

[21] Appl. No.: 193,662

[22] Filed: May 13, 1988

[30] Foreign Application Priority Data

May 13, 1987 [JP] Japan ................................ 62-114565

[51] Int. Cl.[4] ............................................ H02K 15/00

[52] U.S. Cl. ........................................ 29/596; 29/605; 29/736

[58] Field of Search ................. 29/596, 605, 736, 760, 29/761

[56] References Cited

U.S. PATENT DOCUMENTS 4,724,604 2/1988 Kawazoe et al. ..................... 29/606

*Primary Examiner*—P. W. Echols

*Assistant Examiner*—K. Jordan

*Attorney, Agent, or Firm*—Fay, Sharpe, Beall, Fagan, Minnich & McKee

[57] ABSTRACT

A coil mounting method and apparatus is disclosed, for example, for mounting coils to the inner periphery of a cylindrical core in assembling a cylindrical rotary transformer of a VTR cylinder. A wire is wound round the outer periphery of a coil holding jig that is capable of opening and closing in a radial direction. After the coil is formed, the coil holding jig is inserted into a cylindrical article and opened radially to have the coil fitted in a coil groove formed in the inner periphery of the cylindrical article. The mounting of the coil to the inner periphery of a cylindrical article can be done in a short time through a reduced number of steps.

18 Claims, 19 Drawing Sheets

METHOD AND APPARATUS FOR MOUNTING COILS INSIDE A HOLLOW CYLINDRICAL ARTICLE

BACKGROUND OF THE INVENTION

1. Field of the Invention

The present invention relates to a method for mounting coils to the inner periphery of a cylindrical article and an apparatus for practicing the method. More particularly, the present invention relates to a coil mounting method suitable for mounting coils to coil grooves formed in the inner periphery of a cylindrical core in assembling, for example, a cylindrical rotary transformer used in the cylinder of a video tape recorder (VTR), as well as an apparatus for practicing the method.

2. Description of the Prior Art

Recently there has been a tendency to reduce the size and increase the function of video tape recorders (VTR). To cope with this tendency, studies have been made to use a cylindrical rotary transformer in place of the conventional plate shape in VTR.

The coils in the core of such transformers must be received completely in coil grooves formed in the inner peripheral surface of the core so as not to project inwardly from the same surface. This operation can be done only manually over a long time, thus impeding efficient production.

In an effort to overcome this problem there has been proposed such a technique as disclosed in Japanese Patent Laid Open No. 54411/87 (U.S. Pat. No. 4,724,604)as a method for automatically mounting coils to coil grooves formed in the inner periphery of a cylindrical core.

According to the proposed technique, one or several portions of a coil are deformed on the inner peripheral side by means of a coil deforming shaft having a plurality of gripping fingers so that a circumscribed circle or diameter of the coil is contracted; the thus-deformed coil is inserted into a core having coil grooves formed in the inner periphery thereof; and then the deformed portions of the coil thus inserted into the core are expanded by means of a coil expanding shaft having expanding fingers so that the undeformed portions of the coil are fitted into a coil groove of the core. Thereafter, the entire periphery of the coil is pushed against the bottom of the coil groove by means of a pressing roller. In this way there is obtained a product having coils along its inner periphery.

In the above conventional technique, however, the coil is pre-formed in conformity with the diameter of an annular groove which is larger than the diameter of the inner periphery of the core, and is inserted against the inner peripheral surface of the core under utilization of the elasticity of the coil and fitted into a coil groove, the following problems occur.

First it is necessary to use a number of jigs, including a jig for forming a coil in conformity with a predetermined diameter, a jig for holding the coil on the forming jig from the outside, a jig for deforming the thus-held coil inwards and inserting it into a core, a jig for expanding the inserted coil, and a jig for pushing the coil against a coil groove of the core. Thus, not only are many jigs needed, but also a large number of steps must be followed.

Moreover, there is a concern that the coil will be deformed when the coil is pushed against a core groove of the core by means of a roller or the like after its expansion in the core. Particularly, since the coil is deformed to reduce the diameter of its circumscribed circle before it is inserted into the core, the thus-deformed portions will not be restored to the original state completely, thus giving rise to a likelihood of deflection.

Further, since the coil is pre-formed in conformity with the coil grooves of the core, it is necessary to separate the coil into deformed and undeformed portions and enlarge the deformation of the deformed portions when inserting the coil into the core. Besides, the jig for this operation becomes complicated in structure.

SUMMARY OF THE INVENTION

It is an object of the present invention to provide a coil mounting method capable of mounting coils in a short time through a reduced number of steps and an apparatus for practicing the method.

It is another object of the present invention to provide a coil mounting method which permits the use of a reduced number of jigs and which is simple and economical, as well as an apparatus for practicing the method.

It is a further object of the present invention to provide a core mounting method capable of fixing coils uniformly into coil grooves formed in the inner periphery of a core without subsequent deformation such as deflection, as well as an apparatus for practicing the method.

According to the present invention, in order to achieve the above-mentioned objects, a wire is wound around the outer periphery of a coil holding means capable of opening and closing in a radial direction, that is, in a direction to expand the diameter of a circumscribe circle, to form a coil, then the coil holding means is inserted into a cylindrical article and expanded radially to have the coil fitted into a coil groove formed in the inner periphery of the cylindrical article.

The coil holding means is divided into plural portions in a circumferential direction so that the divided portions can slide, expand and close in a radial direction and rotate.

DESCRIPTION OF THE PREFERRED EMBODIMENTS

Embodiments of the present invention will be described hereinunder with reference to the accompanying drawings.

Figure 1:
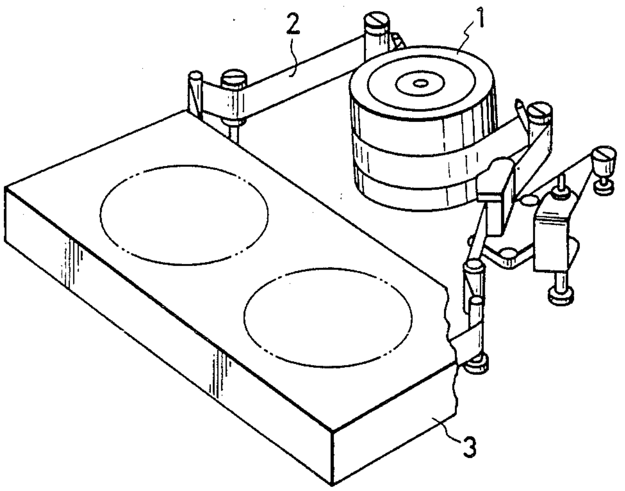
FIG. 1 is a schematic view of a tape travelling system of a VTR.
Figure 2:
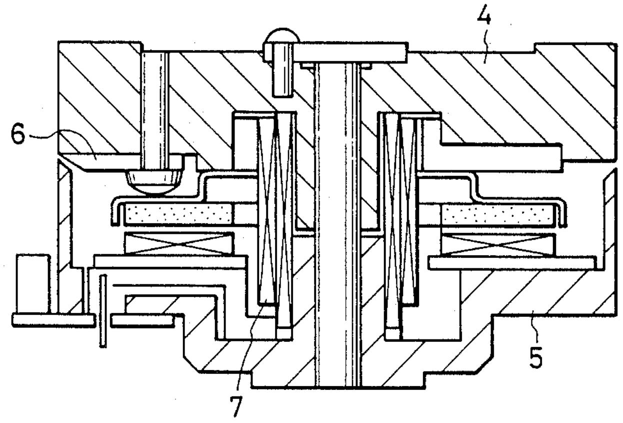
FIG. 2 is a sectional view of a cylinder of the VTR.

FIG. 1 illustrates a tape travelling system of a VTR with a cylindrical rotary transformer incorporated in a VTR cylinder 1. The VTR cylinder 1 is constructed as shown in FIG. 2. A rotary transformer 7 is provided with a cylindrical core 10 having coils fitted in the inner periphery thereof as shown in FIGS. 3 and 4.

In FIG. 1, the reference numeral 1 denotes a cylinder of a VTR; numeral 2 denotes a tape; and numeral 3 a cassette case. The rotary transformer 7 in the VTR cylinder 1 is for transmitting an electric signal corresponding to a video signal in the tape 2 which travels on an upper cylinder 4, to a non-rotatable, lower cylinder 5 of the VTR cylinder 1. The numeral 6 in FIG. 2 denotes a head.

Figure 3:
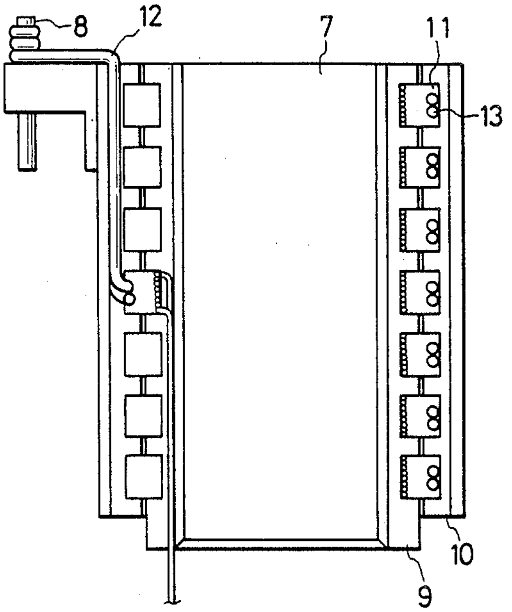
FIG. 3 is an explanatory view of a construction of a rotary transformer.
Figure 4:
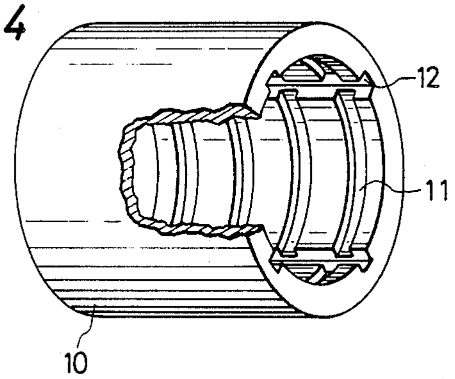
FIG. 4 is a partially cut-away perspective view of a cylindrical core.

In the rotary transformer 7, a cylindrical core (rotor) 10 attached to the upper cylinder 4 which is rotatable, is internally formed with coil grooves 11 for mounting coils 13 in a circumferential direction, as shown in FIGS. 3 and 4. Further, draw-out grooves 12 for receiving coil ends therein are formed in a direction perpendicular to the coil grooves 11.

In FIG. 3, another cylindrical core (stator) 9 is attached to the lower cylinder 5, and coils are mounted on the outer periphery of the core. Numeral 8 denotes a pin for winding end wires of a coil 13 thereon.

The following description is now provided about the method of mounting coils to the inner periphery of the cylindrical core 10.

Figure 5:
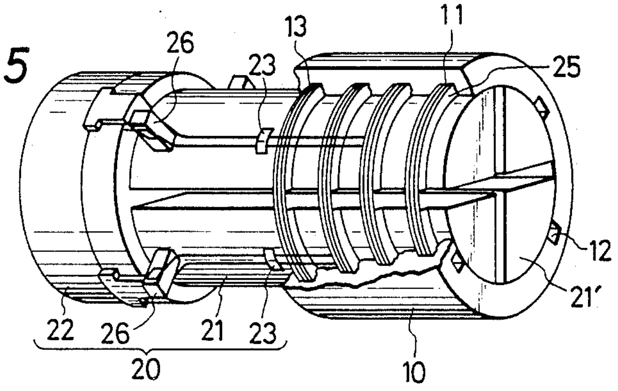
FIG. 5 is a partially cut-away perspective view of an example of a device used in the present invention.

The device shown in FIG. 5 is provided with the cylindrical core 10 and a coil holding jig 20 for mounting coils 13 to the core 10. The cylindrical core 10, as shown in FIGS. 4 and 5, is formed with grooves 11 for the fitting therein of coils 13 in a circumferential direction and is also formed with coil end draw-out grooves 12 for the coils 13 in a direction perpendicular to the coil grooves 11.

The coil holding jig 20 is provided with a pusher 21 for the coils 13, an opening/closing mechanism 22 for the pusher 21, end wire pressers 23, coil guides 25 and end wire retainers 26.

The pusher 21 is divided into plural (e.g. four) pusher pieces 21' in a circumferential direction to push the coil 13 directly into the coil grooves 11 of the cylindrical core 10.

The opening/closing mechanism 22 functions to open and close the plural pusher pieces 21' all at one time in a radial direction, namely, in a direction of expanding the diameter of a circumscribed circle.

Figure 6A:
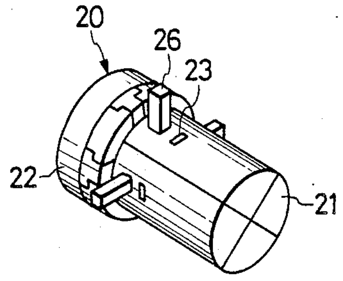
FIGS. 6(A) to (F) are an explanatory views of coil mounting steps employed in the method of the present invention.
Figure 6B:
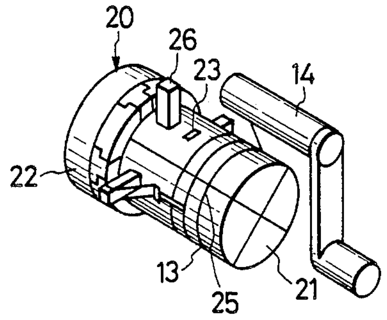
Figure 6C:
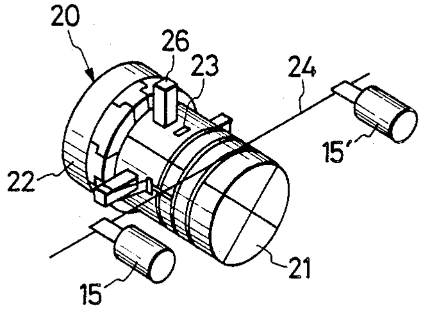

The end wire pressers 23 are provided on the outer peripheral portion of the pusher 21 and function to prevent the floating of a wire 24 [see FIGS. 6(C) and (D)]when drawing out end wires of each coil 13 after winding.

The coil guides 25, which are provided on the outer peripheral portion of the pusher 21, function to guide the wire 24 when winding.

The end wire retainers 26 are also provided on the outer periphery of the pusher 21 and function to position a terminal wire end of each coil 13 after winding.

Figure 6D:
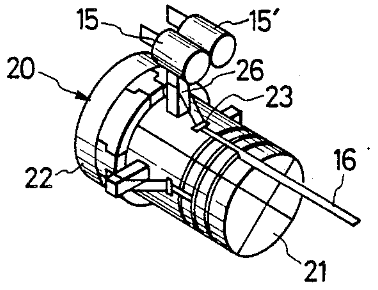

In a winding position, a winding flyer 14 is provided above the outer periphery of the coil holding jig 20, as shown in FIG. 6(B), and forming hands 15 and 15' for the wire 24 are provided as shown in FIG. 6(C). Further, a coil presser pin 16 is disposed as shown in FIG. 6(D).

In a position for mounting each coil 13 after winding to the cylindrical core 10 there is disposed a moving means (not shown) for relative axial movement and fitting of the coil holding jig 20 having the coil 13 and the cylindrical core 10.

The pusher pieces 21' of the pusher 21 in the coil holding jig 20 are each provided with a pawl portion 17, while the opening/closing mechanism 22 is formed with pawl guide grooves 18. The pawl portions 17 are operated by a hydraulic circuit (not shown) disposed in the opening/ closing mechanism 22 to move radially of the pusher 21 along the pawl guide grooves 18 and open or close the pusher pieces 21' radially of the pusher 21.

Explanation will be given below mainly with reference to FIGS. 6(A) to (F) about the steps followed in winding the wire to form coils and mounting the coils to the cylindrical core 10, using the above device.

FIG. 6(A) shows the coil holding jig 20 before winding. The pusher 21 is shown in an external position with respect to the cylindrical core 10, and is to be loaded with the coils 13 in the inner periphery thereof. The pusher 21 of the coil holding jig 20 is initially closed by the opening/closing mechanism 22 so that the outer peripheral surface thereof with the wire 24 wound thereon is not in contact with the inner peripheral surface of the cylindrical core 10. For example, if the inside diameter of the core 10 is 14 mm, the diameter of the wire 24 is 0.2 mm and the clearance between the inner periphery of the core 10 and the outer periphery of the coil 13 after winding is 0.6 mm, the outside diameter of the pusher 21 is set at 13 mm.

FIG. 6(B) shows a step of performing a third winding after the completion of winding two coils. The flyer 14 turns around the outer periphery of the pusher 21 to form a coil 13 having a predetermined number of turns.

At this time, a coil guide 25 functions to prevent dislocation of the wire 24.

FIG. 6(C) shows an end wire forming step for the coil 13. After the completion of the winding in the preceding step, the forming hands 15 and 15' grip the wire 24 on both sides of the pusher 21. Then the outside portions of the wire 24 are cut with cutters (not shown). The forming hands 15 and 15' still gripping the wire 24 operate so as to hook the wire 24 to an end wire presser 23 and an end wire retainer 26. During this wire hooking operation, the coil presser pin 16 presses the end wire draw-out portion of the coil 13 to prevent floating of the coil from the pusher 21.

FIG. 6(D) shows a completed state of end wire forming. After the wire hooking operation, the forming hands 15 and 15' release the wire 24. And after the completion of the winding of the three coils and the end wire processing, the coil holding jig 20 turns 90° about its axis and the fourth coiling is completed by performing a series of the above operations.

Figure 6E:
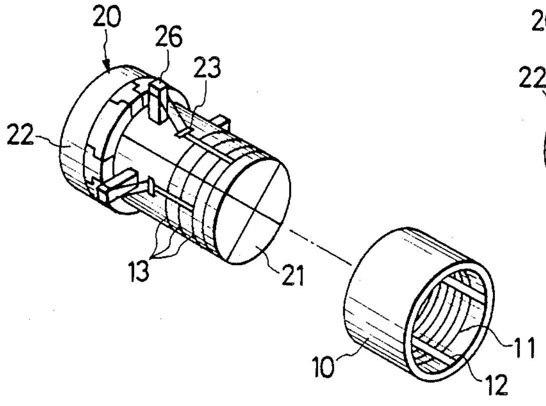

FIG. 6(E) shows a completed state after all of the coils have been wound. The coil holding jig 20 with a predetermined number of coils 13 formed on the outer periphery thereof by the above steps is positioned to coincide with the axis of the cylindrical core 10. Then, it is inserted into the core 10 with an adhesive applied in advance to the coil grooves 11 in the inner periphery thereof. The insertion of the jig 20 is stopped upon coincidence of the coils 13 formed on the coil holding jig 20 with the coil grooves 11 formed in the inner periphery of the core 10. Further, the coil holding jig 20 and the cylindrical core 10 are turned about the axis in a relative manner so that the draw-out grooves 12 in the core 10 and the coil end-wire draw-out positions coincide with each other. This rotational adjustment may be made before the insertion of the jig into the core.

Figure 6F:
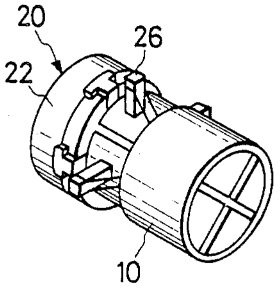

FIG. 6(F) shows a completed state of mounting of the coils 13 to the core 10. When the adjustment of the insertion depth and rotation of the cylindrical core 10 and the coil holding jig 20 has been completed, the pusher 21 is opened by the opening/closing mechanism 22 of the coil holding jig 20 to expand the coils 13 formed on the pusher 21 and push them against the coil grooves 11 of the core 10.

The coil mounting step will be described below in detail with reference to FIGS. 7(A) and (B).

Figure 7A:
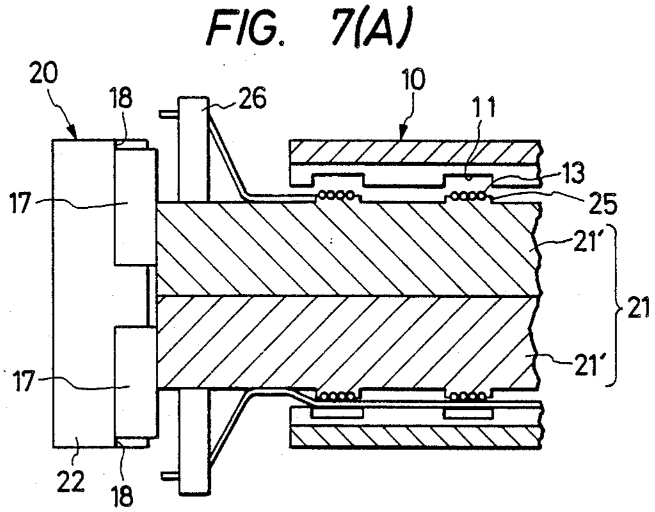
FIGS. 7(A) and (B) are explanatory views of a coil mounting operation.

FIG. 7(A) shows the coil grooves 11 of the cylindrical core 10 and the coils 13 formed on the outer periphery of the coil holding jig 20 in positional coincidence with each other. In this state, a hydraulic circuit (not shown) of the opening/closing mechanism 22 for the pusher 21 is operated to open the pawl portions 17 of the pusher pieces 21' of the pusher 20 in a radial direction of the pusher along the pawl guide grooves 18. As a result, the pusher pieces 21' open together to expand the coils 13 on the outer periphery of the pusher 21 and push them against the coil grooves 11 of the core 10.

Figure 7B:
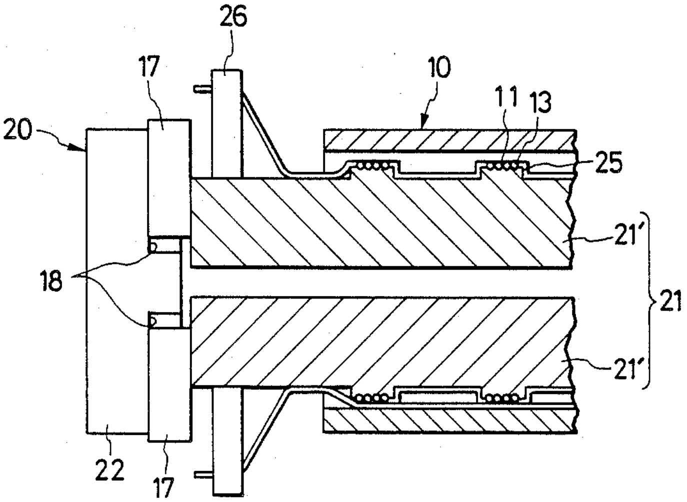

This pressed state is shown in FIG. 7(B). In this case, the pressing force applied to the coils 13 is not weakened because the coil guides 25 are formed thinner than the wire diameter of each coil 13.

The coils 13 thus pressed are fixed to the inner periphery of the core 10 with the adhesive which has been applied to the coil grooves 11 of the core.

Simultaneously with such pressing steps, the end wires which have been positioned by the end wire retainers 26 of the coil holding jig 20 are wound round a terminal pin (pin 8 in FIG. 3) or the like provided in the body of the core 10 by an end wire processor (not shown).

After the coils 13 are fixed to the coil grooves 11 of the core 10, the pusher 21 is closed by the pusher opening/closing mechanism 22. The outside diameter of the pusher 21 reverts to the original state before winding, that is, smaller than the inside diameter of the core 10. At this stage the coil holding jig 20 is pulled out from the core 10.

Through a series of these operations the coils 13 can be fitted into the coil grooves 11 formed in the inner periphery of the cylindrical core 10.

In this embodiment, the coils 13 are expanded in diameter and bonded by virtue of the malleability of the wire 24 of the coils.

Figure 8:
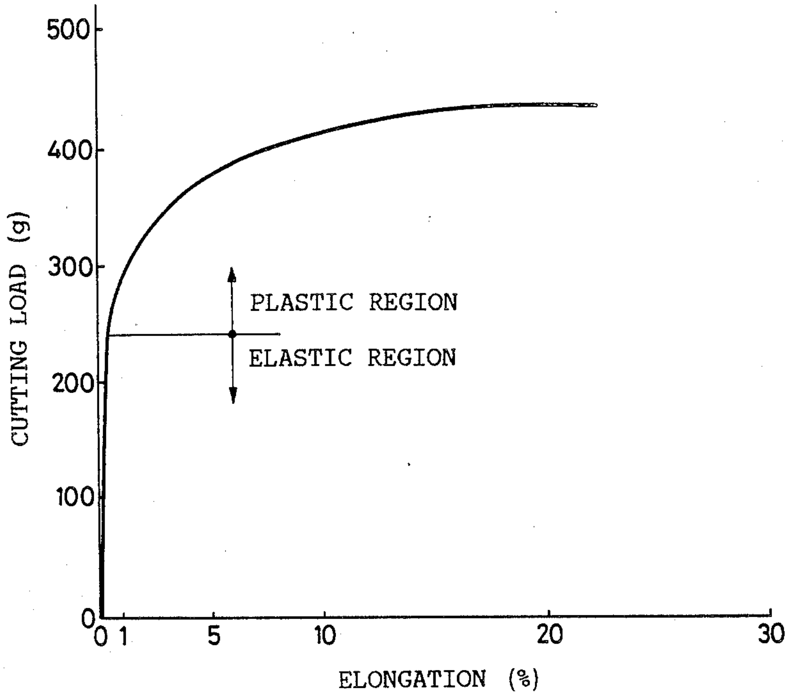
FIG. 8 is a diagram showing an elongation-load relationship of copper wire used as the material of a coil.

FIG. 8 is an elongation-load diagram of the copper wire used as the wire 24. With the copper wire alone, there will not occur the problem of breakage even at an elongation of 20% or so. But, in consideration of exfoliation or breakage of the coating which would cause short-circuit, etc., it is desirable that the elongation from the coil diameter to its expanded diameter be in the range of 3% to 5%. Where a larger expansion is needed, the wire is fed forcibly from the end wire side to maintain the elongation at a predetermined value, thereby preventing the occurrence of a defect.

Thus, the wire is given an elongation to the extent that the exfoliation or breakage of the coating will not occur in the range of a plastic deformation region, whereby the coils 13 can be bonded to the coil grooves 11 formed in the inner periphery of the core 10. Further, even when the jig 20 is pulled out from the core 10 after loading of the coils 13, the coils will never return to the jig.

Although in the above embodiment an adhesive is applied to the coil grooves 11 of the cylindrical core 10, the adhesive may be applied to the coils 13 to improve the working efficiency.

Figure 9:
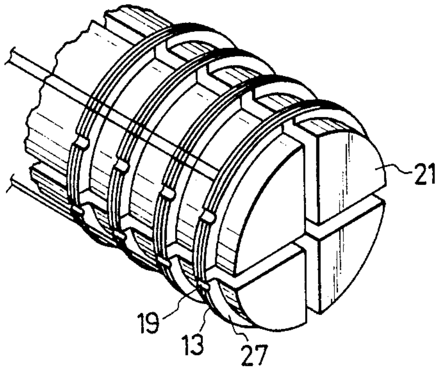
FIG. 9 is a perspective view showing another example of a pusher.

FIG. 9 is a perspective view showing an example of a pusher suitable for the application of an adhesive to the coils. In this example, an adhesive 19 is applied to the coils 13 formed on the pusher 21 at plural points spaced apart in the circumferential direction.

In this example of applying the adhesive 19 to the coils 13, if it is necessary to have the adhesive 19 applied to the entire circumference of each coil groove 11 of the cylindrical core 10, the amount of the adhesive applied should be made larger. In this case, however, it is likely that the adhesive 19 will overflow and adhere to the pusher 21 side. The adhesion of the adhesive 19 to the pusher 21 side can be prevented by forming adhesive escape grooves 27 in the pusher 21, as shown in FIG. 9.

In the above embodiment there has been explained a method of turning the flyer 14 around the outer periphery of the pusher 21 as shown in FIG. 6 as well as a method of holding the wire and drawing out end wires using the forming hands 15, 15' and the coil presser pin 16.

The following description is now provided about another embodiment of a winding method for the coil holding jig and an end wire drawing-out method.

FIGS. 10(A) to (F) show the steps followed from forming a coil up to mounting the coils to the cylindrical core 10.

Figure 10A:
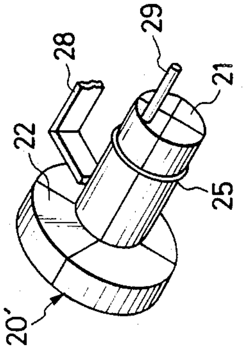
FIGS. 10(A) to (F) are explanatory views of coil mounting steps employed in a method according to a further embodiment of the invention.

FIG. 10(A) shows a coil holding jig 20' before winding. In an initial state, a pusher 21 of the coil holding jig 20' is closed by an opening/closing mechanism 22. The jig 20' is further provided with a wire hook 28 for hooking one end of the wire 24 during winding and an end hook 29 for temporarily holding end wires of a coil after forming and styling. Further, a coil guide 25 formed with a groove having a width which permits the coil to be fitted therein is provided on the outer periphery of the pusher 21.

Figure 10B:
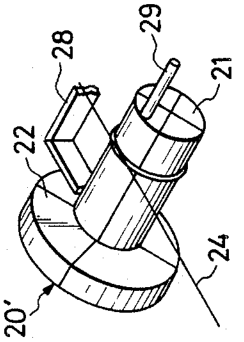

FIG. 10(B) shows a step of hooking one end of the wire 24 to the wire hook 28 and winding the wire along the coil guide 25.

Figure 10C:
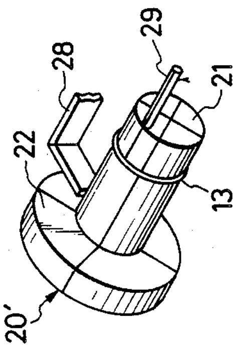

FIG. 10(C) shows a state after styling of the end wires of a coil 13. More specifically, when the wire has been wound along the coil guide 25 and the end wires cut to a predetermined length, the end wires are hooked to the end hook 29 and formed to fit in a draw-out groove 12 of the cylindrical core 10.

Figure 10D:
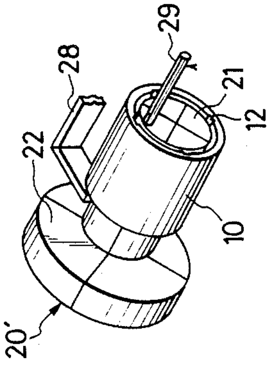

FIG. 10(D) shows a state wherein the coil holding jig 20' has been inserted and positioned in the core 10.

Figure 10E:
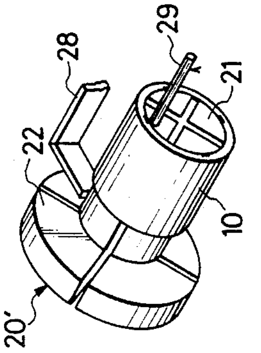

FIG. 10(E) shows a state wherein the pusher 21 is expanded radially from the positioned condition to press the coil on the outer periphery of the pusher 21 against a core groove 11 of the cylindrical core 10.

Figure 10F:
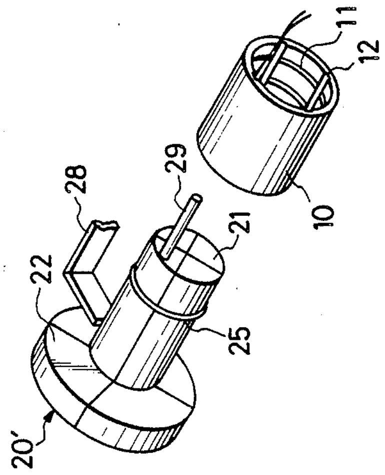

FIG. 10(F) shows a state wherein the coil holding jig 20' has been pulled out from the cylindrical core 10 after completion of fitting the coil in the coil groove 11 of the core 10.

An apparatus for practicing the above steps will be described below with reference to FIGS. 11 to 26.

Figure 11:
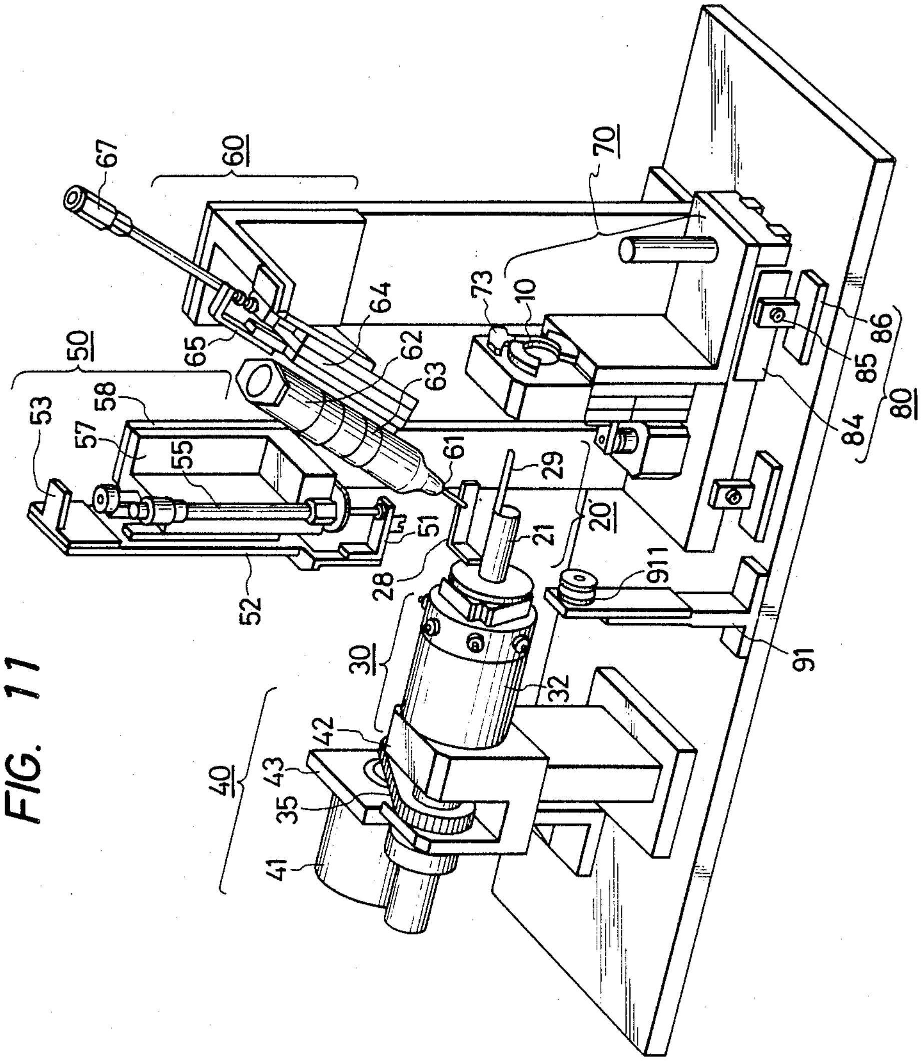
FIG. 11 is a perspective view of a coil mounting apparatus for practicing the method of FIG. 10.
Figure 12:
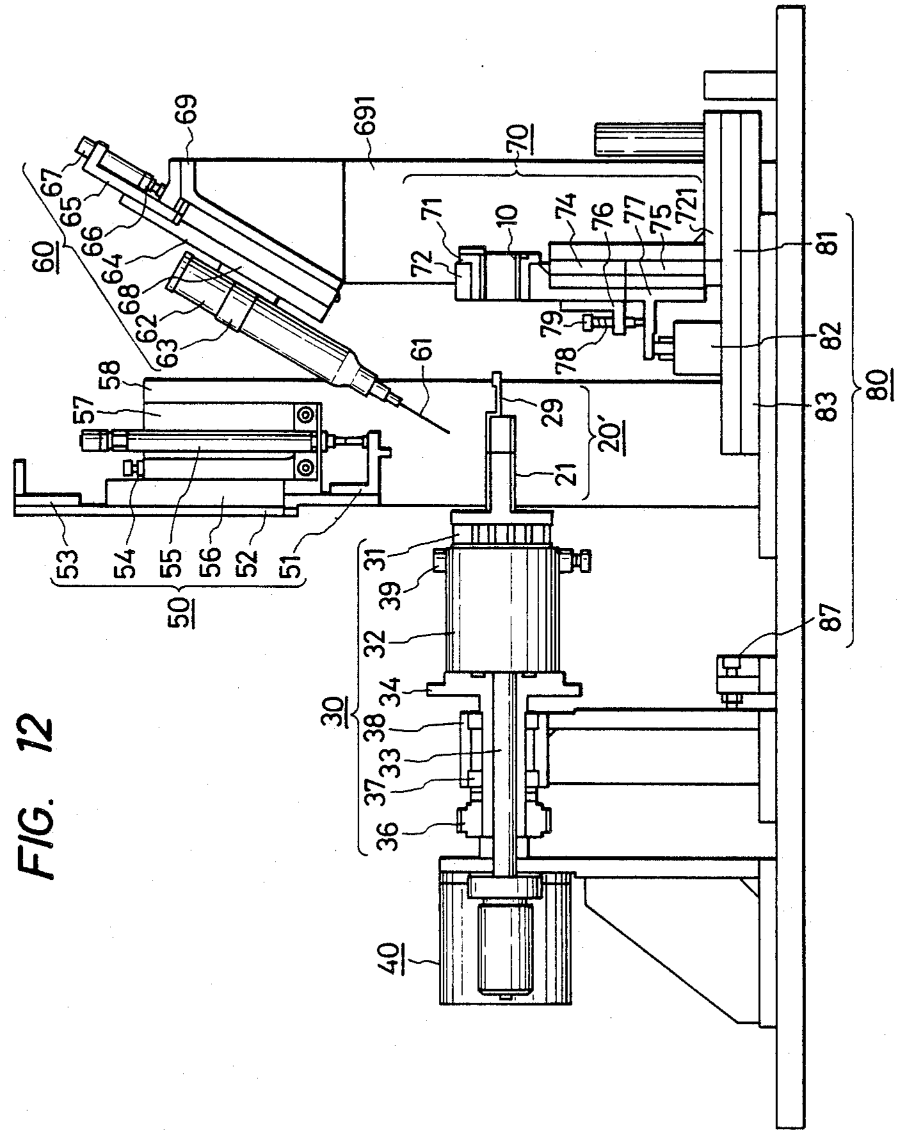
FIG. 12 is a front view of the apparatus of FIG. 11.

FIG. 11 is a perspective view of the apparatus embodying the invention and FIG. 12 is a front view thereof.

Figure 13:
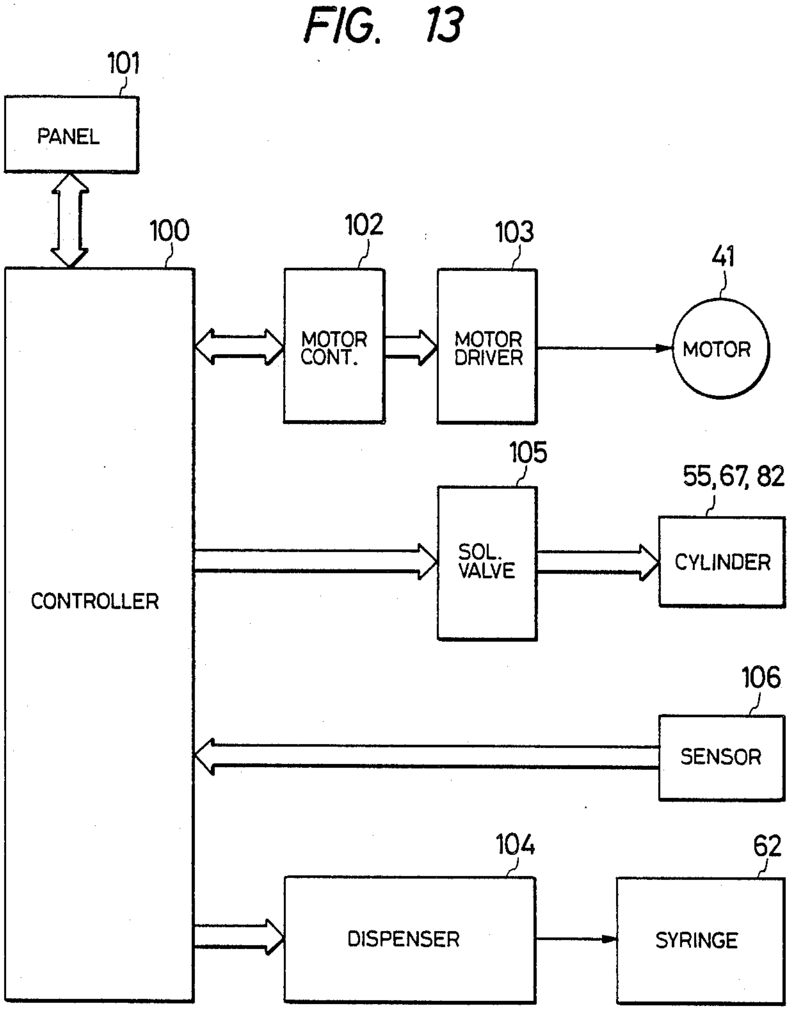
FIG. 13 is a block diagram of a control system for controlling the apparatus of FIG. 11.
Figure 14:
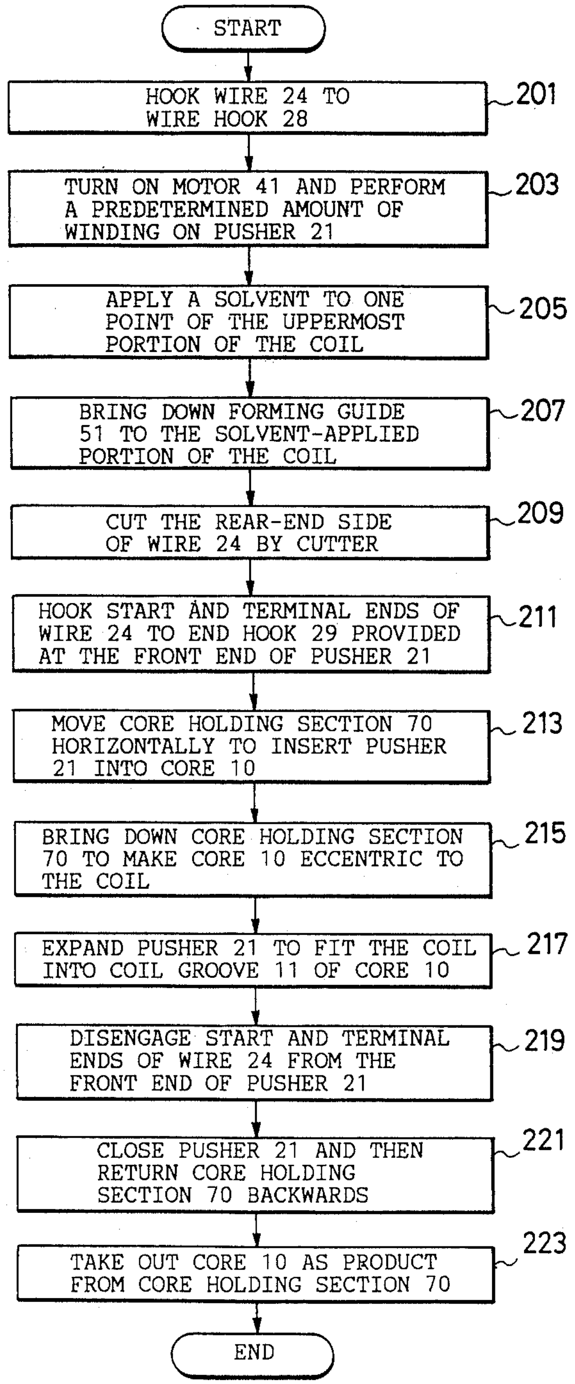
FIG. 14 is a flowchart of the steps of an operation controlled by the control system of FIG. 13.

FIG. 13 is a block diagram of a control system for operating the apparatus shown in FIGS. 11 and 12; FIG. 14 is a flowchart showing an example of the procedure followed in operating the apparatus of the invention; FIGS. 15(A) to (H) show the operation of the apparatus in following the steps based on the flowchart of FIG. 14; and FIGS. 16 to 26 are diagrams for explaining the details of each step.

The inner-periphery coil mounting equipment in the illustrated embodiment, as shown in FIGS. 11 and 12, comprises a coil holding jig 20' for winding a wire and holding the resulting coil, an expanding mechanism section 30 for opening and closing the coil holding jig 20', a motor section 40 for rotating and positioning the coil holding jig 20' and the expanding mechanism section 30, a forming guide section 50 for processing end wires of coils formed on the coil holding jig 20', a solvent applying section 60 for applying a solvent to a forming portion of each coil to fix the forming shape, a core holding section 70 for holding and fixing the cylindrical core 10, a core positioning section 80 for positioning the core holding section 70 in the transverse direction, and a control system (FIG. 13) for controlling operations.

The coil holding jig 20' comprises a pusher 21 for winding the wire 24 thereon and mounting the resulting coils to the cylindrical core 10, an end hook 29 for temporarily holding end-wires of a coil after forming and styling, and a wire hook 28 for keeping one end of the wire 24 hooked during winding.

Figure 16:
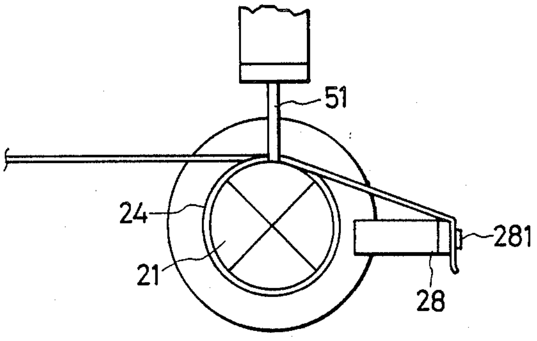
FIG. 16 is a diagram explanatory of a winding state to the pusher.
Figure 19:
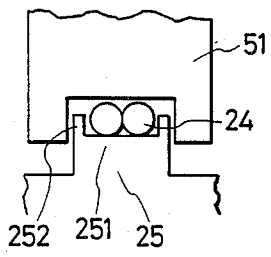

The pusher 21 is divided into plural (e.g. four) pusher pieces 21' as shown in FIG. 16 to push the coil after winding directly into a coil groove 11 of the cylindrical core 10. The portion (coil guide 25) for winding of the pusher is formed with a groove 251 having a width which permits winding of the wire on the outer periphery of the pusher 21, and coil guide portions 252 having a height about a half of the wire diameter are formed on both sides of the groove 251, as shown in FIG. 19.

The end hook 29, which is provided on an end face of the pusher 21, functions to style ends of the wire 24 after winding onto the outer peripheral portion of the coil holding jig 20', so as to be fitted in a drawout groove 12 of the cylindrical core 10, and hold them temporarily.

The wire hook 28 is attached to the pusher 21 in a position close to the base portion of the pusher, so it is synchronized with the rotation of the pusher. Further, it lies in the outer peripheral direction with respect to the central part of the pusher 21 and it is in a diametrical position not causing interference even when the core holding section 70 is slid and positioned close to the coil holding jig 20'. The wire hook 28 is provided with a hook 281 (FIG. 16) for hooking the start end of the wire 24.

Referring to FIG. 12, the expanding mechanism section 30 comprises a pawl portion 31 for mounting the pusher 21, an air chuck 32 for imparting opening/closing motion to the pawl portion 31, a stopper 39 for adjusting the amount of opening and that of closing, an air feed pipe 33 for feeding driving air to the air chuck 32, a flange 34 for holding the air chuck 32, a timing pulley 36 mounted on the flange 34 to receive the rotating force of the motor section 40 through a timing belt 35, a bearing 37 for smoothing the rotation of the flange 34, and a bracket 38 for holding the expanding mechanism section 30.

The pawl portion 31 holds the base portion of the pusher 21 and functions to have the wire 24 on the outer periphery of the pusher 21 fitted in a coil groove 11 and a draw-out groove 12 of the cylindrical core 10 in accordance with the opening/closing motion of the air chuck 32.

The air chuck 32 functions to perform opening/closing motion under the supply of air at a predetermined pressure. It is a rotary type which permits a continuous supply of air even under rotation of the chuck.

The stopper 39 is for abutment with the pawl portion 31 to adjust the coil diameter when the pusher 21 is closed and the loading diameter when the pusher is expanded. By adjusting those diameters it is made possible to use cylindrical cores 10 of different inside diameters or different depths of coil grooves 11.

The air feed pipe 33 is for feeding driving air to the rotary air chuck 32. It is fixed to the air chuck 32 and can supply air without being influenced by the rotation of the chuck.

The flange 34 holds an end face of the air chuck 32 on the side opposite to the pawl portion 31. It is centrally formed with a hole for passing the air feed pipe 33 therethrough and the outer periphery thereof is machined as a shaft for the mounting thereon of the timing pulley 36 and the bearing 37.

The motor section 40 comprises a motor 41, a timing pulley 42 and a bracket 43 for holding the motor section. The timing pulley 42 is rotated by the rotation of the motor 41 and this motion is transmitted to the flange 34 of the expanding mechanism section 30 through the timing belt 35 to rotate the flange.

The forming guide section 50 comprises a forming guide 51 for pressing down the wire 24 wound round the outer periphery of the pusher 21 to prevent the wire 24 from floating during styling, a guide plate 52 for holding the forming guide 51, a stopper 53 attached to the guide plate 52 to restrict the descent of the forming guide 51, an adjustor 54 for abutment with the stopper 53 to adjust the amount of descent, an air cylinder 55 for moving the forming guide 51 vertically, a linear guide 56 serving as a guide during the vertical movement, a block 57 for holding the forming guide section 50, and a bracket 58 which supports the block 57.

Figure 17:
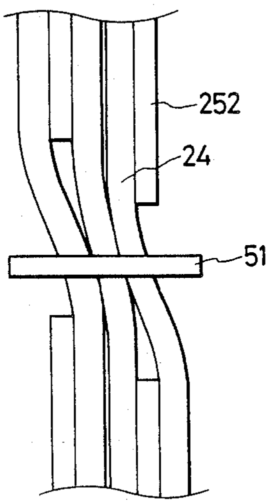
FIGS. 17 to 19 are explanatory views of a forming guide.

The forming guide 51 has a thickness about the same as the diameter of the wire 24, as shown in FIG. 17, whereby at the time of styling of the end portions of the wire 24 the end portions can be given an appropriate curvature at bent points thereof and also given a size capable of being received within the width of the draw-out groove 12 of the cylindrical core 10. The portion of the forming guide 51 in contact with the wire 24 is formed with a slit of a size which permits the coil guide portions 252 on both sides of the groove 251 to fit in the slit in a wound state of the wire 24 along the groove 251 formed in the outer periphery of the pusher 21, as shown in FIG. 19. The depth of the slit is almost the same as the diameter of the wire 24. In the presence of this slit the wire 24 can be held down to a sufficient extent during styling and so can be prevented from floating.

The solvent applying section 60 is for bonding between adjacent portions of the wire which has a self-fusing property, and it comprises a nozzle 61 for dropping a solvent onto the wire 24, a syringe 62 for supplying the solvent contained therein to the nozzle 61, a concave plate 63 for keeping the syringe 62 fixed, a fixing plate 64 for fixing the syringe 62 through the concave plate 63, a stopper 65 attached to the fixing plate 64 to restrict the descent of the syringe 62, an adjustor 66 for adjusting the amount of descent by contact with the stopper 65, an air syringe 67 for moving the cylinder 62 vertically, a linear guide 68 serving as a guide during the vertical movement, a block 69 for holding the solvent applying section 60, and a bracket 691 which supports the block 69.

The core holding section 70 comprises a core holder 71 for holding the cylindrical core 10 in an inserted state, a holder plate 72 for holding the core holder 71, a swivel stop 73 attached to the holder plate 72 to position the air holder 71 in a rotating direction, upper and lower guides 74 and 75 used when the core 10 is made eccentric vertically in conformity with the pusher 21, an L-shaped metallic piece 76 mounted on the side of the upper guide 74, a T-shaped metallic piece 77 mounted on the side of the lower guide 75, a pressurizing spring 78 for pressing the L-shaped metallic piece 76 against the T-shaped metallic piece 77, a pressurizing bolt 79 extending through the pressurizing spring 78 and attached to the T-shaped metallic piece 77, and a bracket 721 which supports the core holding section 70.

The core positioning section 80 comprises a plate 81 for mounting the core holding section 70, a jig cylinder 82 mounted on the plate 81 to move the cylindrical core 10 vertically eccentrically through the T-shaped metallic piece 77 of the core holding section 70, a linear guide 83 serving as a guide when moving the core holding section 70 to the pusher 21, a core positioner 84 attached to a side face of the linear guide 83 for feed in conformity with the pitch of the coil groove 11 of the core 10, a spring plunger 85 adapted to contact and press a grooved portion of the core positioner 84 to effect positioning, a holder 86 for holding the spring plunger 85, and a stopper 87 for preventing collision at the foremost end in a forward movement of the core positioning section 80.

As shown in FIG. 11, a preliminary wire guide 91 is provided for guiding the wire 24 into the coil groove 251 when winding the wire around the outer periphery of the pusher 21 of the coil holding jig 20'. The guide 91 is positioned in the circumferential direction of the coil groove 251, which position is at a distance not causing interference even when the core holding portion 70 is moved leftwards.

The control system, as shown in FIG. 13, comprises a controller 100 for monitoring and controlling various operations, an operation panel 101 for providing operation commands to the controller 100 and displaying the state of operation, a motor controller 102 for controlling the operation of the motor 41 in accordance with a command provided from the controller 100, a motor driver 103 for rotatively driving the motor 41 in accordance with an output pulse from the motor controller 102, a solenoid valve 105 for driving various air cylinders in accordance with commands provided from the controller 100, and a dispenser 104 for controlling the cylinder 62 of the solvent applicator in accordance with a command from the controller 100.

Although various sensors are not shown in the embodiment of FIGS. 11 and 12, these sensors, indicated at 106 in FIG. 13, are all connected to the controller 100 as shown in FIG. 13. The controller 100 monitors information provided from each such sensor and can thereby grasp the state of operation of the apparatus correctly.

The operation of the inner-periphery coil mounting apparatus of the above embodiment will be described with reference to FIGS. 14 to 26.

Figure 15A:
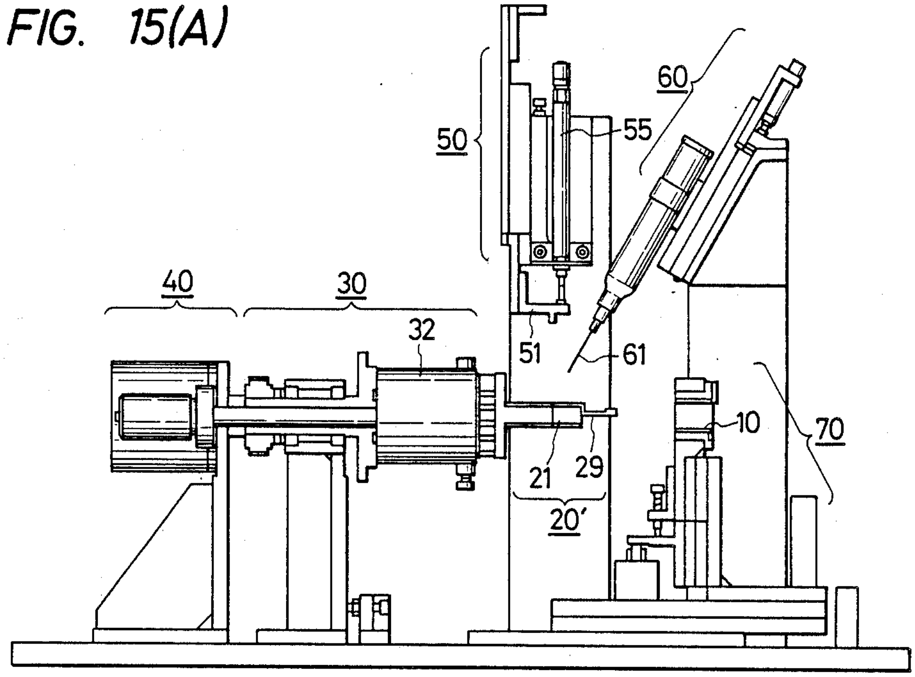
FIGS. 15(A) to (H) show the apparatus of FIG. 11 used in following the steps of the method of the--.

First, as shown in FIG. 15(A), the coil holding jig 20' is in an external position with respect to the cylindrical core 10 to be mounted with coils in the inner periphery thereof, and in an initial state the pusher 21 is closed by the air chuck 32 so that the outer peripheral surface thereof is out of contact with the inner peripheral surface of the cylindrical core 10 even in a wound state of the wire 24 around the outer periphery of the pusher. For example, if the inside diameter of the core 10 is 14 mm, the diameter of the wire 24 to be wound is 0.2 mm and the clearance between the inside diameter of the core 10 and the outside diameter of the coil formed by winding of the wire is 0.3 mm in the radial direction, and the outside diameter of the pusher 21 is 13 mm.

In this case, the forming guide section 50 is set at its raised end position, the solvent applying section 60 is at its raised end position, the core holding section 70 at its rightmost position, and the motor section 40 at an origin position (with the wire hook 28 assuming its position shown in FIG. 11) at which an origin sensor turns ON.

Figure 15B:
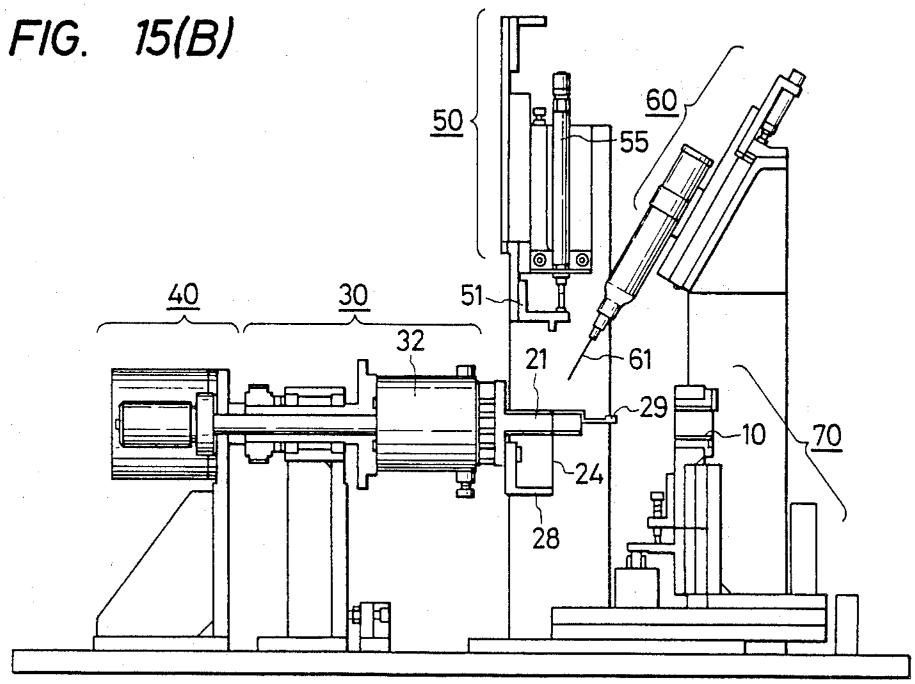

FIG. 15(B) shows a state just after the start of winding. The wire 24 is fed through a tension device (not shown) and a roller 911 of the preliminary wire guide 91 shown in FIG. 11. The start end of the wire 24 is gripped and engaged with a hook portion 281 of the wire hook 28 positioned in an outer peripheral direction of the pusher 21, by some device (e.g. a special arm, not shown), (step 201 in FIG. 14). At this time, the wire 24 is positioned to enter the coil groove 251 of the pusher 21 located halfway of its path due to a positional relation between the wire hook 28 and the roller 911 of the preliminary wire guide 91.

Next, the controller 100 outputs a drive command to the motor controller 102, which in turn causes the motor 41 to rotate by only a preprogrammed amount of rotation. As a result, the pusher 21 rotates a predetermined amount with the start end of the wire 24 engaged with the hook portion 281, whereby the wire 24 is positively fitted in the coil groove 251 formed in the outer periphery of the pusher 21 while being imparted with an appropriate tension by the tension device (step 203).

The pusher 21 now having the wire 24 wound thereon by a predetermined number of turns is controlled to stop rotation in the same origin position as in the initial state [FIG. 15(A)].

Figure 15C:
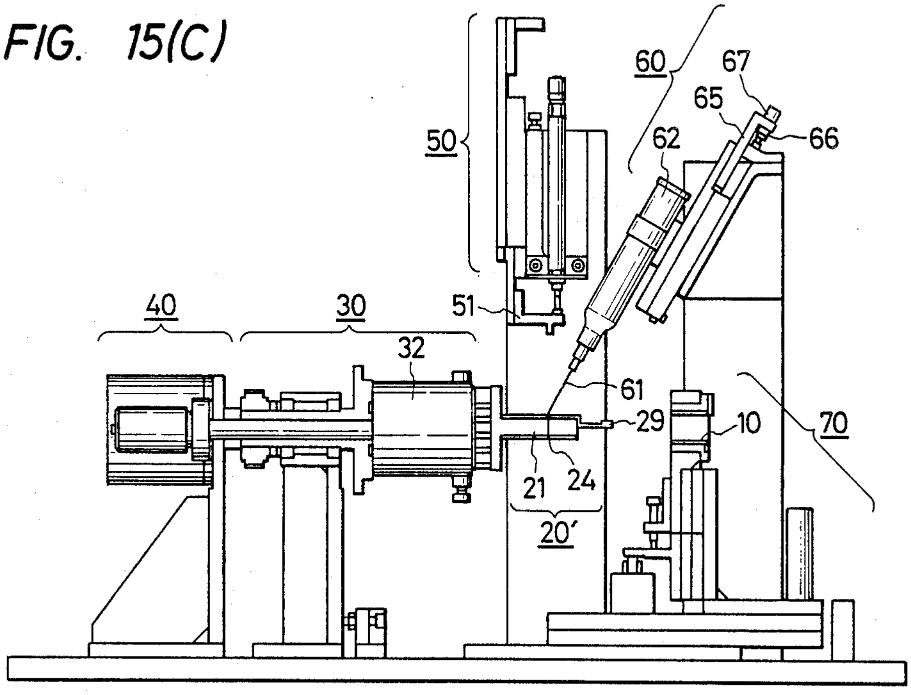

FIG. 15(C) shows a solvent-applied state for interwire bonding. In order to maintain the wound state of the wire 24 around the outer periphery of the pusher 21 it is necessary to apply a solvent to the outer periphery of the wire 24 which is a self-fusing wire, thereby bonding the wire.

First, the air cylinder 67 is operated to bring the nozzle 61 of the cylinder 62 positioned at its raised end down to the position of the wire 24. In this case, the descent end position is adjusted by the adjustor 66 which abuts the stopper 65 so that the tip end of the nozzle 61 is located at the front end of the cylinder 62 in an appropriate position with respect to the wire 24. An appropriate amount of a solvent is dropped from the nozzle 61 thus held in an appropriate position with respect to the wire 24. The amount of the solvent to be dropped is preset to the dispenser 104 shown in FIG. 13 in accordance with various conditions. After dropping the predetermined amount of solvent, the controller 100 causes the air cylinder 67 to return and pull up the cylinder 62 to its raised end position.

Figure 15D:
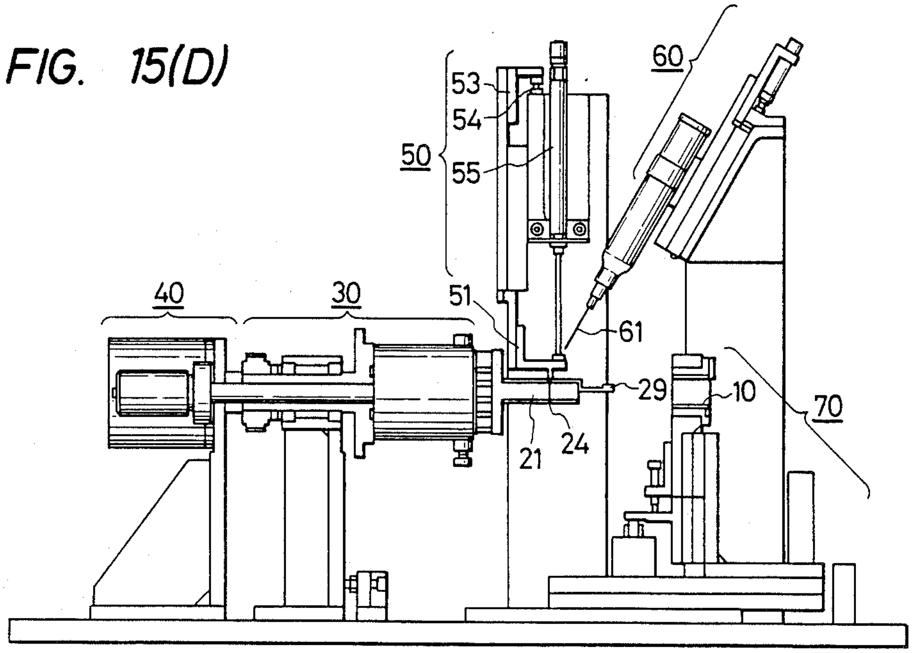
Figure 15E:
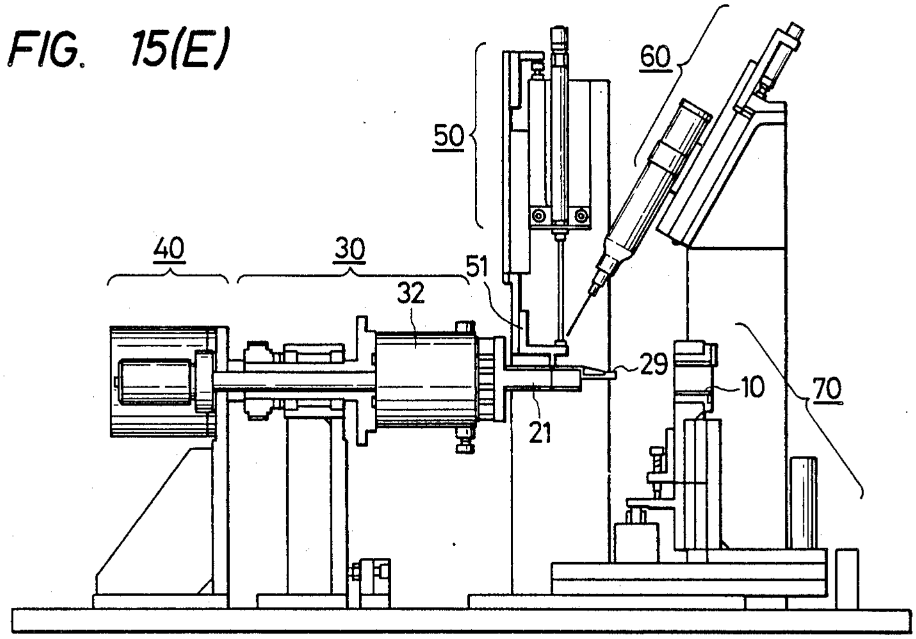

FIG. 15(D) shows a descended state of the forming guide 51. In styling the wire 24 on the pusher 21 so as to enter the cylindrical core 10 which wire has been subjected to the interwire bonding in the previous step, the forming guide 51 is brought down when the motor section 40 assumes its origin position, that is, when the crossed point of the start and terminal ends of the wire 24 in the coil groove 251 of the pusher 21 is in an upper position. Air is fed to the air cylinder 55 of the forming guide section 50 to bring down the forming guide 51 which is in its raised end position (step 207). The positioning in the descent is preadjusted by the adjustor 54 which abuts stopper 53. This positioning is done by pressing the wire 24 lightly without applying such a force as will cut the wire.

Then, the wire is cut into a predetermined length which corresponds to the length required for styling end wires, in an intermediate position between the pusher 21 and the preliminary wire guide 91, by means of a cutter (not shown) (step 209) (FIG. 16).

Thereafter, it is necessary that the end wire thus cut and the end wire engaged with the hook portion 281 be hooked to the end hook 29 using a special arm or the like (not shown) under control made by the controller 100.

After the wire was wound round the outer periphery of the pusher 21 and its end portions cut into a predetermined length in the preceding step, the pusher with the coil thus formed is inserted into the cylindrical core 10. At this time, the end wires are subjected to forming so as to be fitted in a draw-out groove 12 of the core 10 without being hooked to any portion.

Figure 18:
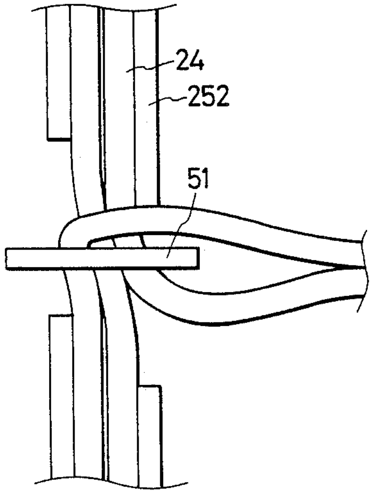

In order to have the end wires hooked to the end hook 29 as shown in FIG. 18 from the state of the wire 24 being held down by the forming guide 51 (FIG. 17), the start end side of the wire 24 is disengaged automatically from the hook portion 281 of the wire hook 28, while the terminal end side of the wire which has been cut is brought into engagement with the end hook 29 (step 211). Since the end hook 29 is formed with a groove having the same width as the width of the draw-out groove 12 of the cylindrical core 10, it holds the wire through the said groove thereof, whereby the end wires can be easily positioned in the draw-out groove 12 of the core 10.

Figure 15F:
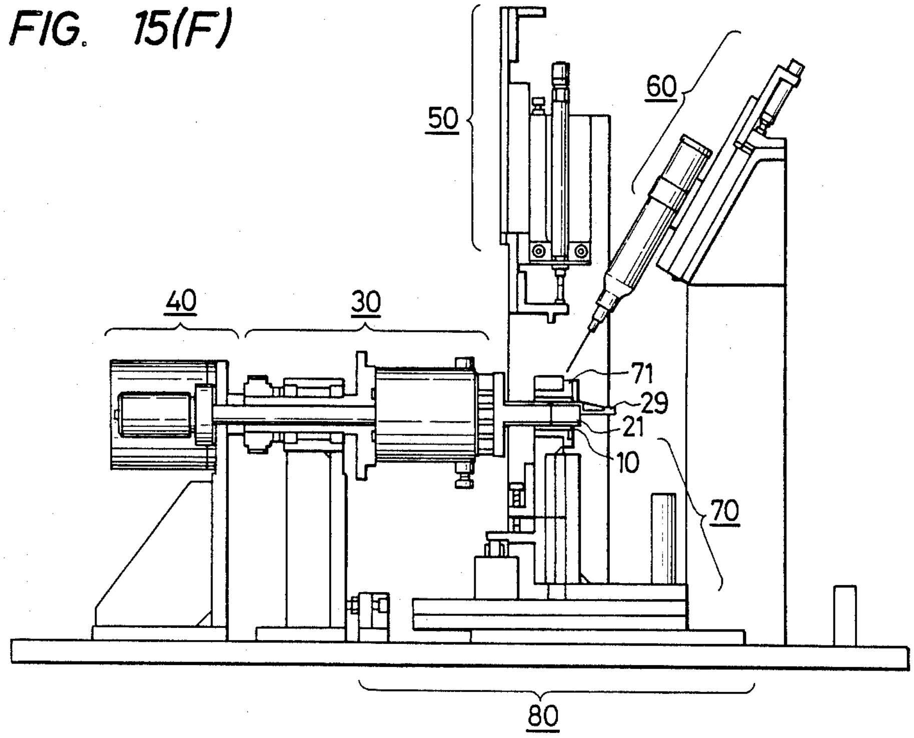

FIG. 15(F) shows a state wherein the coil holding jig 20' after the completion of winding and styling is inserted into the core holding section 70.

In the initial state the central position of the pusher 21 and that of the core holding section 70 are coincident with each other, so the core holding section 70 is moved horizontally by a drive means (not shown) comprising, for example, a motor and a ball screw to conform the coil position on the pusher 21 to the position of a coil groove 11 of the cylindrical core 10 (step 213). At this time, the grooved portion of the core positioner 84 attached to the side face of the core holding section 70 and the fixing spring plunger 85 come into engagement with each other, whereby the positioning can be done easily. Where a high accuracy positioning is required, there may be used a servo motor system without using the plunger, etc. The angle in the rotating direction of the core holder 71 is adjusted so that the angle in the rotating direction of the draw-out grooves 12 of the cylindrical core 10 in the core holding section 70 and that of the end wire draw-out grooves on the pusher 21 are coincident with each other. Further, the outside diameter of the pusher 21 with coils formed thereon is set so as to give clearance with respect to the inside diameter of the core 10, so there is no fear of contact of the coils with the core 10 at the time of insertion of the pusher into the core holding section 70 which would otherwise cause defects, e.g. damage to the coating.

After completion of the positioning of the coil on the pusher 21 and the coil groove 11 of the cylindrical core 10, the core 10 is rendered eccentric. More specifically, upon completion of the positioning of the coil and the coil groove 11 in the preceding step, the jig cylinder 82 is brought down, so that the holder plate 72 is depressed by the action of the pressurizing spring 78 to render the core eccentric (step 215). The eccentric quantity depends on the clearance between the coil groove 11 of the cylindrical core 10 and the coil on the pusher 21, and the pressing force is determined by the biasing force of the pressurizing spring 78.

The reason for such pressing from above in advance is that since the coil on the pusher 21 is held in place by only the bonding force of the self-fusing wire, a mere radial expansion of the pusher 21 would cause the wire portions at the end-wire draw-out position to get loose, so this is prevented.

Figure 20:
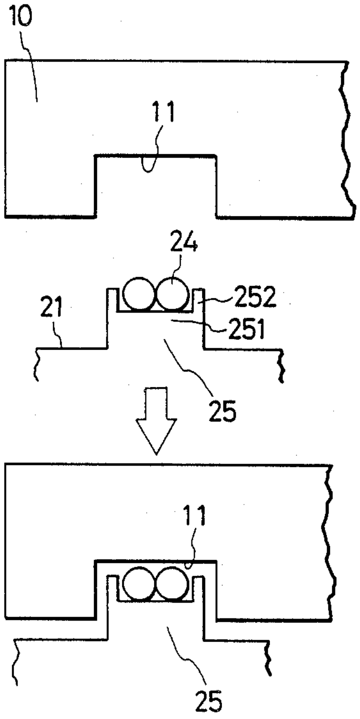
FIGS. 20 and 21 are diagrams for explaining the mounting of a coil.
Figure 21:
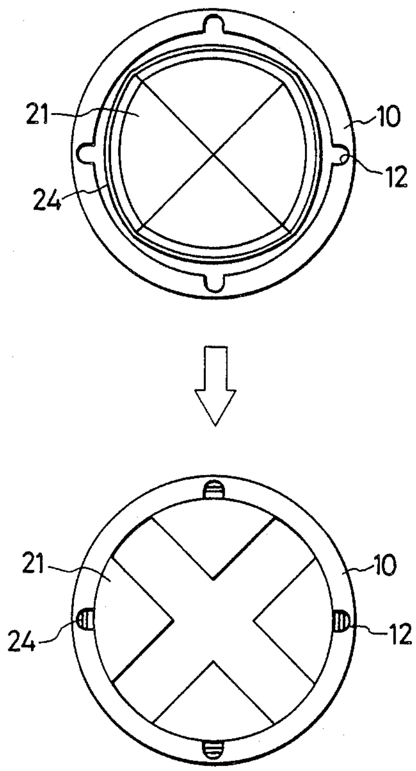

Thereafter, the pusher 21 is expanded radially to urge the coil on the outer periphery of the pusher 21 against the coil groove 11 of the core 10. More specifically, the pusher 21 is expanded radially with respect to the coil groove 11 of the core 10 which was positioned eccentrically in the preceding step. The expanding force exceeds the biasing force of the pressurizing spring 78, thus resulting in positional coincidence centrally and the coil on the outer periphery of the pusher 21 being expanded and urged against the bottom of the coil groove 11 (step 217) (FIG. 20). As shown in FIG. 21, moreover, since the outer periphery of the pusher 21 is made to correspond with the radius of the bottom of the coil groove 11, it is possible to prevent the coil 13 from floating from the cylindrical core 10. The amount the pusher 21 is to be expanded is adjusted by the stopper 39 and is set in consideration of the deformations of the pusher 21, etc. so that the wire 24 can be fully pushed into the bottom of the coil groove 11.

Figure 15G:
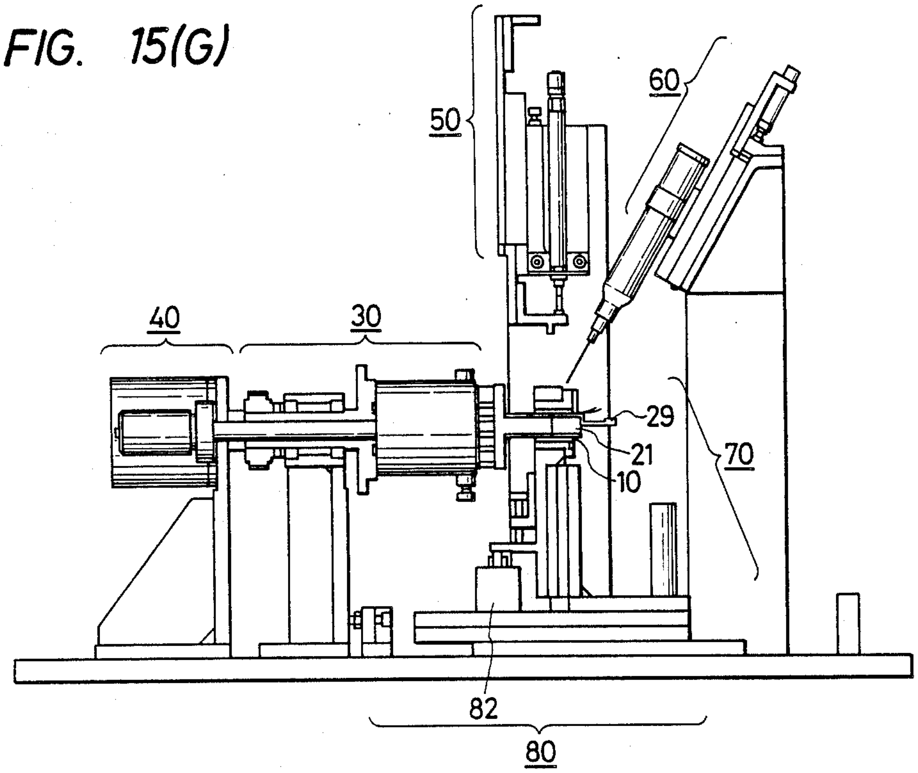

FIG. 15(G) shows a state after loading of the coil on the pusher 21 into the cylindrical core 10. The pusher 21 which pushed the coil against the bottom of the coil groove 11 of the core 10 is closed. In advance of this operation, the jig cylinder 82 of the core holding section 70 is raised to release the eccentric condition of the core 10 with respect to the pusher 21, whereby the core 10 can be prevented from again striking against the pusher 21 and causing its damage.

The wire 24 wound round the coil groove 251 in the outer periphery of the pusher 21 has been subjected to plastic deformation, so it will never revert to its original smaller size in diameter when the pusher is closed. Besides, the interwire bonding of the wire 24 is only at one upper point thereof and the amount of the solvent dropped to that point is small, so there is no fear of adhesion of the solvent to the pusher 21.

Further, the end portions of the wire 24 are pushed against a draw-out groove 12 of the cylindrical core 10 and thus prevented from projecting from the inner peripheral surface of the core.

Next, when pulling out the core holding section 70, a special removing arm (not shown) is operated to disengage the wire 24 from the end hook 29 so that the coil may not be pulled from the end wires (steps 219, 221).

Figure 15H:
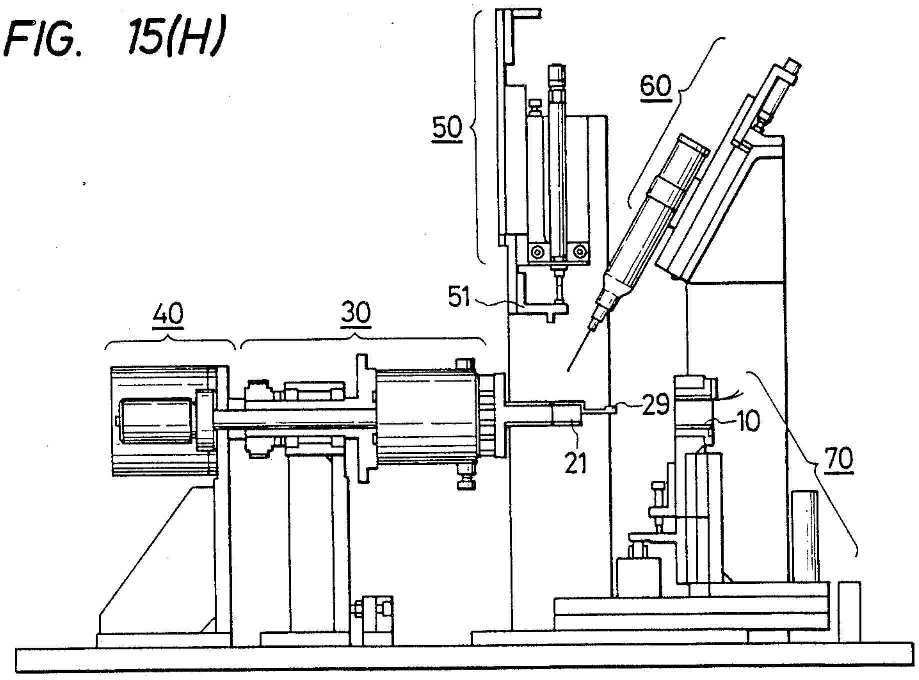

FIG. 15(H) shows a completed state of winding along the coil groove 11 of the cylindrical core 10. The cylindrical core 10 with the coil fitted in the coil groove 11 in the preceding step is pulled out together with the core holding section 70 (step 223). Like the insertion, the pulling-out of the core can be done easily because there is a clearance between the outer periphery of the pusher 21 and the inner periphery of the core 10 and further because the coil will never project from the inner peripheral surface of the core.

After the core holding section 70 was thus pulled out, the controller 100 provides a product takeout command to another system such as a robot, which in turn takes out the cylindrical core 10 from the core holder 71 in accordance with the command. The mounting of the coil to the inner periphery of the cylindrical article is completed by a series of operations described above.

Figure 22:
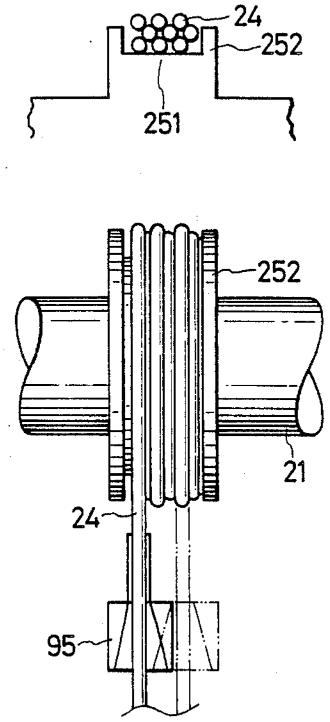
FIG. 22 is a diagram for explaining another example of winding.

Although in the above embodiment the wire diameter was set at a value permitting two turns in the coil groove 251, it is also possible to use a finer wire. In the case of a multi-turn winding of a fine wire, as shown in FIG. 22, it is necessary to wind the wire to form two, three and further layers, so with only the preliminary wire guide 91 it is difficult to position those wound layers in the coil groove 251. To overcome this problem, the wire nozzle 95 is positioned near the outer periphery of the pusher 21 and is moved by a distance corresponding to the wire diameter at every rotation of the pusher 21, whereby it is made possible to effect an orderly winding.

Figure 23:
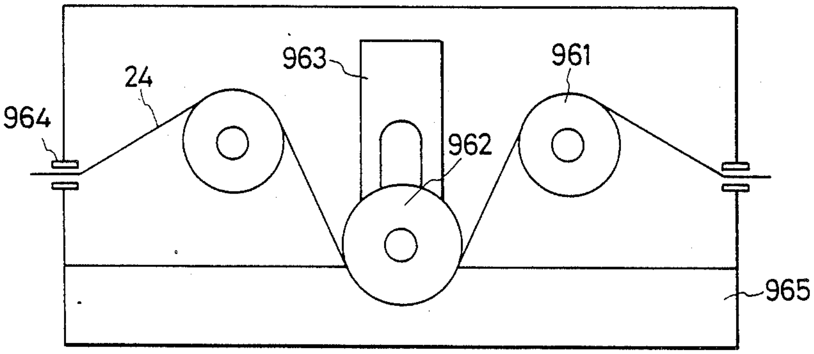
FIG. 23 is an explanatory view of another example of solvent application.

Further, although in the foregoing embodiment the application of an interwire bonding solvent for the wire 24 is included as one independent step, there may be adopted such a solvent dipping method as shown in FIG. 23. According to the solvent dipping method, the wire 24 is passed through a wire port 964 halfway of its path, then passed round two sets of rollers 961 and is dipped in a solvent solution 965 in a position intermediate between the two rollers by means of a dipping roller 962. In this case, if the dipping roller 962 is fixed, the solvent will be applied to the overall length of the wire, so a roller support 963 is moved vertically according to the amount of the wire fed, whereby the solvent can be applied to only the required portions. Thus, the solvent application step is no longer needed unlike the foregoing embodiment.

Figure 24:
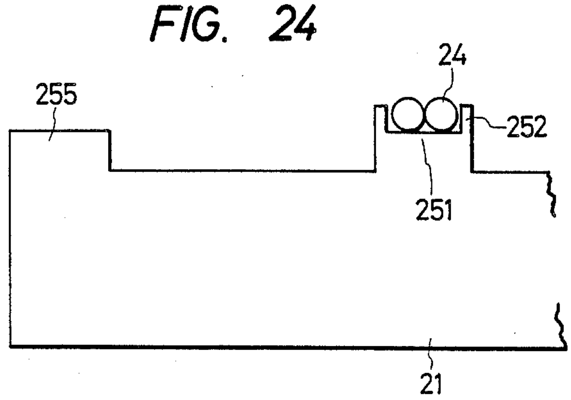
FIG. 24 is an explanatory view of a further example of a pusher.

In the foregoing embodiment the wire 24 wound round the outer periphery of the pusher 21 is pushed into a coil groove 11 of the cylindrical core 10 by only the opening/closing motion of the pusher 21, but there is the possibility that the pushing between the circumferentially-divided pusher pieces 21' will be insufficient. In view of this point there can be used a pusher 21 having such a pushing portion 255 as shown in FIG. 24, whereby the coil can be positively fitted in the coil groove. More specifically, the pushing portion 255 has the same outside diameter as that of the coil groove 251 of the pusher 21 and the pitch thereof is conformed to the pitch of the coil groove 11 of the cylindrical core 10. It is necessary that the coils formed on the outer periphery of the pusher be fitted in the coil grooves 11 of the core 10 from the inner side when viewed from the end wire drawing-out direction, regardless of the winding method. Therefore, when a coil is to be fitted in the innermost coil groove 11 of the core 10, the portion of the pusher with the coil formed in the coil groove 251 in FIG. 24 is opposed to the coil groove 11 in which the coil is to be fitted, and a series of operations are performed. Thereafter, the pusher 21 is pulled out by one groove pitch and the angle of the pusher 21 or the angle in the circumferential direction of the cylindrical core 10 is shifted by 45°. This is for preventing the gap of the pusher pieces 21' from overlapping again. By performing the opening/closing operation of the pusher 21 in this state the coil can be pushed in throughout the entire circumference, so it becomes possible to effect the loading of the coil without floating.

Figure 25:
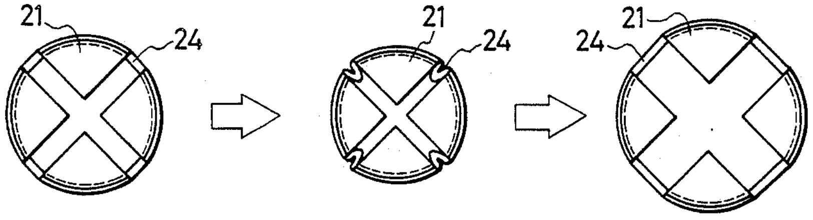
FIG. 25 is a diagram showing another example of winding to the pusher.
Figure 26:
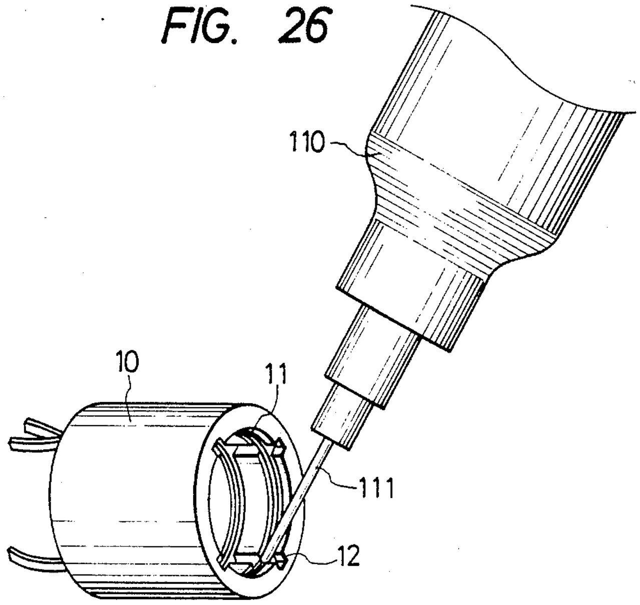
FIG. 26 is an explanatory view showing the application of an adhesive.

In the foregoing embodiment the amount of expansion is determined by the inside diameter of the cylindrical core 10 and the depth of each coil groove 11. Further, the elongation of the wire can be suppressed by imparting a preliminary deformation thereto as shown in FIG. 25 in order to diminish the damage to the wire. More specifically, the outside diameter of the pusher 21 is set at a value 1% to 2% smaller than the inside diameter of the coil groove 11 of the cylindrical core 10, and the wire is wound round the outer periphery of the pusher 21, followed by the application of a solvent and the styling of the end wires. Thereafter, the pusher 21 is closed to fit inside the core 10. At this time, the wire portion positioned between adjacent pusher pieces 21' is deformed and received therebetween so as not to project. Of course, the shape of the pusher 21 is predeformed so that a gap is formed between adjacent pusher pieces 21' also at the time of insertion into the core. In this pre-deformed state, the coil is positioned in a coil groove 11 of the cylindrical core 10 and the pusher 21 is opened in the same manner as in the foregoing embodiment to have the coil fitted in the coil groove 11. At this time, the floating of the coil can be prevented by using the pusher 21 having the pushing portion 255 as explained in connection with FIG. 24.

The method for fixing the coil to the cylindrical core 10 is not shown in the foregoing embodiment. This is because the wire 24 does not return out of engagement with the core 10 even upon removal of the pusher 21 since the wire itself is given a plastic deformation. It does not matter whether the application of an adhesive is made before or after the loading of the coil. Even when an adhesive is applied to only the end wire draw-out grooves 12 from the cylinder 110 through the nozzle 111 in a completed state of coiling in all the coil grooves 11 of the cylindrical core 10, there is obtained a sufficient bonding force.

In the foregoing embodiment of the present invention there is adopted a wire expanding method for the loading of coil into the cylindrical core. In the embodiment the wire is expanded to about 3% in term of the amount of its elongation. It has experimentally been confirmed that an elongation of the wire up to 15% will not cause damage to the wire and the coating. That is, in the embodiment of the present invention there is no fear of damage to the wire.

In the embodiment of the invention described above there is used no adhesive during winding or during loading of the resulting coil, so it is possible to prevent the occurrence of equipment troubles caused by the use of an adhesive and there can be attained improvement in working efficiency of the equipment.

Further, since the degree of opening and closing of the coil holding jig which performs winding and loading can be adjusted freely, it is possible to handle products of different sizes.

In the above description the coil holding jig has the wire wound thereon to form a (ring) coil, for inserting the resulting coil into the core and for mounting it to the inner periphery of the core. Instead of using only a single jig there may be used another jig for winding the wire and the coil formed thereby may be inserted into the core and opened radially for mounting through a loading jig. The number of jigs used is not specially limited if only the coil formed by winding the wire can be expanded by a jig so that the coil as fitted in the inner periphery of the core is larger in outside diameter than the coil as wound round the jig.

In the foregoing embodiment, moreover, in loading the coil 13 formed on the outer periphery of the pusher 21 into the cylindrical core 10, the pawl portions of the pusher pieces 21' of the pusher are operated by the hydraulic circuit provided in the opening/closing mechanism 22 of the pusher 21 to expand the coil 13. However, this expansion of the coil 13 may be done using another method.

Figure 27A:
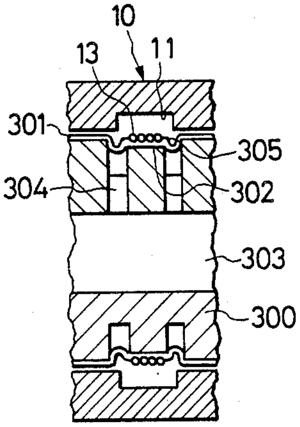
FIGS. 27(A), (B) and FIGS. 28(A), (B) are sectional views respectively showing different examples of pusher opening/closing mechanisms of coil holding jigs.
Figure 28A:
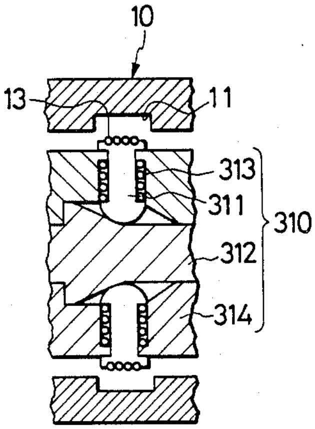

FIGS. 27(A), (B) and FIGS. 28(A), (B) are sectional views showing other examples of opening/closing mechanisms for the expansion of the coil.

In the example shown in FIGS. 27(A) and (B) there is used a rubber actuator 300. And a rubber film 301 is fitted on the outer periphery of the rubber actuator 300.

Further, the rubber actuator 300 is centrally formed with an air passing hole 303, and auxiliary air holes 304 extend from the air passing hole 303 in the radial direction of the rubber actuator 300. The auxiliary air holes 304 are provided in a plural number in the circumferential direction of the rubber actuator 300.

The rubber film 301 is provided with a coil receiving portion 302 and a coil guide 305.

FIG. 27(A) shows a state before the coil 13 formed on the rubber actuator 300 is fitted in the cylindrical core 10. The rubber film 301 is formed so as to assume a position not exceeding the outside diameter of the rubber actuator 300 even when the coil receiving portion 302 receives the coil 13 thereon in a state not expanded with pressurized air. Using the rubber actuator 300, there are performed operations, like the foregoing embodiment, from winding of the wire into the coil 13 up to positioning of the coil to a coil groove 11 formed in the inner periphery of the cylindrical core 10.

Figure 27B:
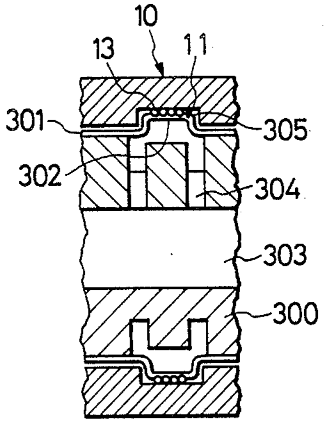

FIG. 27(B) shows a mounted state of the coil 13 to the core 10. Pressurized air is supplied through the air passing hole 303 formed in the central part of the rubber actuator 300. The pressurized air passes through the auxiliary air holes 304 and generates a power to expand the rubber film 301 radially. As a result, the coil 13 on the rubber film 301 is pushed against the coil groove 11 formed in the inner periphery of the core 10 while expanding. By these operations the coil 13 can be mounted to the core 10. Thereafter, the supply of the pressurized air is stopped and the rubber film 301 reverts to its original state by virtue of its restoring force.

In performing the winding operation using the rubber actuator 300, the coil guide 305 serving as a wire guide is provided intermittently throughout the whole circumference of the actuator so does not impede the expansion of the rubber film 301.

Moreover, in loading the coil 13 using the rubber actuator 300, it is easy to obtain a uniform urging force throughout the entire circumference, so the elongation of the coil 13 becomes uniform and the foregoing exfoliation of the coating, etc. can be prevented effectively.

In the example shown in FIGS. 28(A) and (B) there is used an expanding jig 310. The expanding jig 310 comprises an outer shaft portion 314, a shaft cam 312 incorporated in a central part of the outer shaft portion 314, and coil push-out portions 311 provided in the radial direction of the outer shaft portion 314.

The shaft cam 312 is formed in the shape of a gentle slope in the axial direction of a column. It is mounted axially slidably to cause the coil push-out portions 311 to project.

The coil push-out portions 311 are provided in a plural number around the axis of the outer shaft portion 314. The coil push-out portions 311, which are pushed in a withdrawing direction by means of a compression spring 313, are operated in a projecting direction by the shaft cam 312.

FIG. 28(A) shows a state before the coil 13 formed on the expanding jig 310 is mounted to the cylindrical core 10. In this state, the coil push-out portions 311 are in abutment with the smallest-diameter portion of the shaft cam 312 to minimize the projection of the portions 311 and in this state, like the foregoing embodiment, there are performed operations from winding of the wire into the coil 13 up to positioning of the coil next to a coil groove 11 formed in the inner periphery of the cylindrical core 10.

Figure 28B:
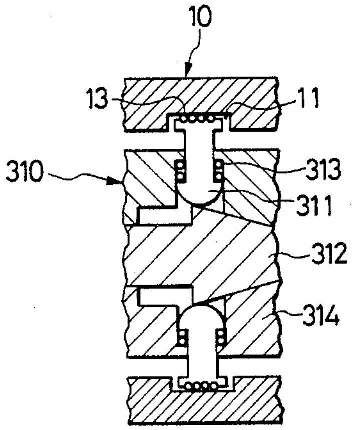

FIG. 28(B) shows a mounted state of the coil 13 to the core 10. In mounting the coil 13, the shaft cam 312 of the expanding jig 310 is moved in a direction to project the coil push-out portions 311. As a result, the coil push-out portions 311 project together toward the outer periphery of the outer shaft portion 314 along the slope of the shaft cam 312. By this operation the coil 13 formed on the coil push-out portions 311 can be pushed against and fitted in the coil groove 11 formed in the inner periphery of the cylindrical core 10. After loading of the coil 13, the shaft cam 312 is returned to its original position, resulting in that the compression spring 313 for bringing the coil push-out portions 311 into abutment with the shaft cam 312 acts to depress the coil push-out portions 311. Then, the whole of the expanding jig 310 is pulled out from the core 10.

The pushing and mounting of the coil 13 into the coil groove 11 formed in the inner periphery of the cylindrical core 10 is not limited to the structures described above. Any other structure may be adopted if only the diameter of the coil 13 can be expanded uniformly at the time of its loading.

According to the present invention set forth hereinabove, the coil mounting method can be realized by a step of winding a wire around the outer periphery of a coil holding jig capable of opening and closing in a radial direction and a step of inserting the coil holding jig into a cylindrical core, opening it in the radial direction and fitting the coil formed by the above wire-winding step into a coil groove formed in the inner periphery of the core. And in a place outside the cylindrical core to be loaded with coils it is possible to wind a wire around the outer periphery of the coil holding jig by a predetermined number of turns and that of coil layers. Consequently, the number of steps can be reduced and the winding time shortened even when the number of coil turns and that of coil layers are increased.

According to the present invention, moreover, plural layers of coils can simultaneously be fitted in coil grooves formed in the inner periphery of a cylindrical core and the processing of the coil end wires can be done in parallel with the loading of coils, so the coil mounting operation and the coil end-wire processing operation can be done efficiently even when the number of coil layers is increased.

Further, there can be attained an economic merit because of a reduced number of jigs used, including the coil holding jig, and because of a simple construction.

Additionally, since the wire used is subjected to plastic deformation, the coils thereby formed can be bonded uniformly to coil grooves of a core to prevent floating of the coils.

What is claimed is:

1. A method for mounting coils to the inner periphery of a hollow cylindrical article, comprising the steps of:

providing means for holding and expanding a coil, said holding and expanding means having a substantially circular outer surface and having means for opening and closing in a radial direction so as to increase the diameter of said circular outer surface;

winding a wire around said circular outer surface to form a coil of substantially circular shape having a first outer diameter;

inserting said coil holding and expanding means into the hollow cylindrical article with the coil formed thereon; and expanding the coil formed around the circular outer surface by opening said coil holding and expanding means in the radial direction so that the diameter of the coil holding and expanding means is increased to be substantially equivalent to the inner periphery of the hollow cylindrical article and the coil undergoes an elongation and a plastic deformation to expand the size of the coil to a second coil outer diameter that is greater in diameter than said first coil outer diameter, and mounting the expanded coil of the second coil outer diameter to the inner periphery of the hollow cylindrical article.

2. A coil mounting method according to claim 1, including expanding the coil with said coil holding and expanding means being divided into plural portions in a circumferential direction so that the divided portions can slide, open and close in the radial direction.

3. A method for mounting coils according to claim 2, wherein said expanding further includes expanding the coil by opening said coil holding and expanding means and thereafter closing, rotating and again expanding said coil holding and expanding means so that gaps between the divided portions of the coil holding and expanding means do not overlap one another after said rotating.

4. A coil mounting method according to claim 1, wherein said coil holding and expanding means has a guide for winding the wire around the outer periphery thereof.

5. A coil mounting method according to claim 1, wherein the cylindrical article has a plurality of coil grooves formed in the inner periphery thereof, and said winding includes providing said coil holding and expanding means with a plurality of coil guides formed on the outer periphery thereof in positions corresponding to said plural coil grooves and winding the wire on said plurality of coil guides to form the coil.

6. A coil mounting method according to claim 1, further including the cylindrical article having a plurality of coil grooves formed in the inner periphery thereof, and said winding including said coil holding and expanding means having a plurality of coil guides projecting outwardly from the circular outer surface thereof on which the wire is wound to form the coil; and said expanding including expanding the coil formed on one of the coil guides to fit the expanded coil into a respective one of said plural coil grooves, said coil holding and expanding means being opened to an extent such that each of said coil guides extends into a respective one of said coil grooves.

7. A method for mounting coils according to claim 6, wherein said expanding of the coil causes an inner diameter of the coil to expand to a dimension that is greater than the inner periphery of the hollow cylindrical article so as to completely fill the respective one of the plural coil grooves.

8. A method for mounting coils according to claim 1, wherein said expanding includes expanding the coil to cause three percent to fifteen percent elongation of the wire forming the coil.

9. A method for mounting coils to the inner periphery of a hollow cylindrical article, comprising the steps of:

providing a coil holding and expanding means capable of opening and closing in a radial direction;

forming a ring coil having an outer periphery that is smaller than the inner periphery of the cylindrical article;

inserting said ring coil into the hollow cylindrical article with said coil holding and expanding means; and expanding the ring coil by opening said coil holding and expanding means in the radial direction to cause the ring coil to undergo plastic deformation so that the outer periphery of the ring coil is expanded to substantially the same dimension as the dimension of the inner periphery of the hollow cylindrical article, and mounting the ring coil to the inner periphery of the cylindrical article.

10. A coil mounting method according to claim 9, wherein said expanding of the coil causes three percent to fifteen percent elongation of the wire forming the coil.

11. A method for mounting coils to the inner periphery of a core, which method comprises hooking a start end side of a wire to a wire hook adjacent to a coil holding jig capable of opening and closing in a radial direction and then winding the wire in a predetermined quantity around said coil holding jig to form a coil;

thereafter, cutting a rear end side of the wire;

hooking start and terminal ends of the wire to an end hook provided at an end portion of said coil holding jig;

inserting said coil holding jig into the core and making the position of the coil wound around said coil holding jig to match a coil groove formed in the inner periphery of the core;

opening said coil holding jig in the radial direction to radially expand and plastically deform the coil to fit the coil completely into said coil groove formed in the inner periphery of the core, and disengaging the start and terminal ends of the wire from said end hook; and closing said coil holding jig and thereafter pulling out the jig from the interior of the core.

12. A coil mounting method according to claim 11, further including forming the start and terminal ends of the wire to fit in a draw-out groove that joins the coil groove formed in the inner periphery of the core prior to said disengaging of the start and terminal ends of the wire from said end hook.

13. A coil mounting method according to claim 11, wherein said opening of said coil holding jig radially expands and plastically deforms the coil to cause three percent to fifteen percent elongation of the wire forming the coil.

14. An apparatus for mounting coils to the inner periphery of a hollow cylindrical article, comprising:

coil holding means having an outer periphery for holding a coil formed therearound, closing said coil holding means including means for opening and closing said coil holding means in a radial direction between open and closed positions respectively wherein in said closed position an outside diameter of a coil on the coil holding means is smaller than the inner periphery of the hollow cylindrical article, and in said open position the outside diameter of the coil is substantially the same as the inner periphery of the cylindrical article;

forming means for processing end wires of the coil formed on said coil holding means;

means for holding the cylindrical article; and means for positioning said coil holding means and said cylindrical article holding means with respect to one another.

15. A coil mounting apparatus according to claim 14, wherein said coil holding means has a pusher having an outer peripheral surface about which the wire is wound for forming and mounting the coil to the cylindrical article, an end hook for temporarily holding the end wires of the coil after forming, and a wire hook for retaining one end of the wire during winding.

16. A coil mounting apparatus according to claim 14, further including:

means for rotating and positioning said coil holding means; and solvent applying means for applying a solvent to a portion of the coil after forming and fixing a forming shape of the coil.

17. An apparatus for mounting coils in coil grooves formed in the inner periphery of a hollow cylindrical article, comprising:

means for holding and expanding a coil, said means having a substantially circular outer surface and including means for opening and closing in a radial direction so as to expand the coil to cause elongation and plastic deformation such that the coil expands to a second coil outer diameter that is greater than a first coil outer diameter and greater in diameter than the inner periphery of the hollow cylindrical article;

means for winding a wire around said circular outer surface including means for rotating said coil holding and expanding means to form a coil of substantially circular shape having said first outer diameter; and means for positioning said coil holding and expanding means relative to the hollow cylindrical article such that said coil holding and expanding means is inserted into said hollow cylindrical article with the coil formed thereon in alignment with one of said coil grooves.

18. A coil mounting apparatus according to claim 17, further including said coil holding and expanding means having coil guides projecting outwardly from the outer circular surface thereof on which the coil is formed, said coil guides having height and width dimensions such that each of said coil guides projects inwardly into a respective one of said coil grooves for mounting an expanded coil in the respective coil groove.

* * * * *